(12) United States Patent
Goncharov et al.

(10) Patent No.: US 11,894,026 B1
(45) Date of Patent: Feb. 6, 2024

(54) MAGNETIC RECORDING HEAD HAVING LEADS OVER THE TRAILING SHIELD FOR ASSISTING ELECTRIC CURRENTS

(71) Applicant: Western Digital Technologies, Inc., San Jose, CA (US)

(72) Inventors: Alexander Goncharov, Morgan Hill, CA (US); Muhammad Asif Bashir, San Jose, CA (US); Petrus Antonius Van Der Heijden, Cupertino, CA (US); Yunfei Ding, Fremont, CA (US); Zhigang Bai, Fremont, CA (US); James Terrence Olson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/845,788

(22) Filed: Jun. 21, 2022

(51) Int. Cl.
  *G11B 5/11* (2006.01)
  *G11B 5/115* (2006.01)
(52) U.S. Cl.
  CPC .................. *G11B 5/115* (2013.01)
(58) Field of Classification Search
  None
  See application file for complete search history.

(56) References Cited

U.S. PATENT DOCUMENTS

| | | | |
|---|---|---|---|
| 6,201,653 | B1 | 3/2001 | Contreras et al. |
| 7,212,367 | B2 | 5/2007 | Clinton et al. |
| 7,593,184 | B2 | 9/2009 | Clinton et al. |
| 7,724,469 | B2 | 5/2010 | Gao et al. |
| 7,848,054 | B2 | 12/2010 | Hsiao et al. |
| 8,179,747 | B1 | 5/2012 | Mugino et al. |

(Continued)

FOREIGN PATENT DOCUMENTS

| | | |
|---|---|---|
| CN | 104835510 B | 11/2017 |
| JP | 2013251042 A | 12/2013 |
| WO | 2015126326 A1 | 8/2015 |

OTHER PUBLICATIONS

Mallary et al. "Head and Media Challenges for 3 Tb/in2 Microwave-Assisted Magnetic Recording," IEEE Transactions on Magnetics, vol. 50, No. 7, Jul. 2014, 8 pages.

(Continued)

*Primary Examiner* — William J Klimowicz
(74) *Attorney, Agent, or Firm* — PATTERSON + SHERIDAN, LLP; Steven H. VerSteeg

(57) ABSTRACT

The present disclosure is generally related to a magnetic recording device comprising a magnetic recording head having a first current flow in a cross-track direction through a trailing shield. In one or more embodiments, a second current flows in a cross-track direction around the main pole. The magnetic recording device comprises a main pole disposed between a trailing shield, a leading shield, and side shields. A trailing gap is disposed between the side shields and the trailing shield. A high moment seed layer is disposed between the main pole and the trailing shield. A first insulation layer is disposed within the trailing shield and directs the first current through the trailing shield, guided to the proximity of the main pole. A second insulation layer, disposed below the trailing shield, directs the second current through the trailing shield, or alternatively through the side shields and around the main pole.

23 Claims, 15 Drawing Sheets

(56) References Cited

U.S. PATENT DOCUMENTS

| | | | |
|---|---|---|---|
| 8,411,390 B2* | 4/2013 | Franca-Neto | G11B 5/1278 360/123.06 |
| 8,472,135 B1 | 6/2013 | Kusukawa et al. | |
| 8,547,656 B2 | 10/2013 | Igarashi et al. | |
| 8,547,661 B2 | 10/2013 | Bai | |
| 8,582,240 B1 | 11/2013 | Chen et al. | |
| 8,587,900 B2* | 11/2013 | Franca-Neto | G11B 5/1278 360/125.32 |
| 8,705,206 B1 | 4/2014 | Maeda et al. | |
| 8,724,242 B2 | 5/2014 | Gao | |
| 8,724,259 B1* | 5/2014 | Liu | G11B 5/4886 360/125.15 |
| 8,737,006 B2 | 5/2014 | Livshitz et al. | |
| 8,786,984 B2* | 7/2014 | Das | G11B 5/315 360/110 |
| 8,929,030 B2 | 1/2015 | Hou et al. | |
| 8,988,826 B2 | 3/2015 | Sugiyama et al. | |
| 8,995,088 B1 | 3/2015 | Boone et al. | |
| 9,001,465 B1 | 4/2015 | Shimizu et al. | |
| 9,019,646 B2 | 4/2015 | Rausch et al. | |
| 9,159,339 B2* | 10/2015 | Scholz | G11B 5/1278 |
| 9,230,571 B1 | 1/2016 | Chen et al. | |
| 9,275,672 B2 | 3/2016 | Shiroishi et al. | |
| 9,299,367 B1* | 3/2016 | Tang | G11B 5/315 |
| 9,355,655 B1 | 5/2016 | Udo et al. | |
| 9,368,135 B2 | 6/2016 | Gao | |
| 9,443,541 B1* | 9/2016 | Liu | G11B 5/315 |
| 9,478,242 B1 | 10/2016 | Liu et al. | |
| 9,536,548 B1* | 1/2017 | Narayana | G11B 5/17 |
| 9,691,416 B1 | 6/2017 | Izawa et al. | |
| 9,792,933 B2 | 10/2017 | Koizumi et al. | |
| 9,881,637 B1 | 1/2018 | Wilson et al. | |
| 10,121,497 B1 | 11/2018 | Takahashi et al. | |
| 10,181,334 B1 | 1/2019 | Song et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,388,305 B1 | 8/2019 | De Albuquerque et al. | |
| 10,446,178 B1 | 10/2019 | Tang et al. | |
| 10,580,441 B1 | 3/2020 | Chen et al. | |
| 10,593,355 B1 | 3/2020 | Basu et al. | |
| 10,706,876 B1 | 7/2020 | Rausch et al. | |
| 10,777,219 B1 | 9/2020 | Asif Bashir et al. | |
| 10,789,977 B1* | 9/2020 | Song | G11B 5/3906 |
| 10,861,485 B1 | 12/2020 | Asif Bashir et al. | |
| 10,867,626 B1* | 12/2020 | Li | G11B 5/1278 |
| 10,891,974 B1 | 1/2021 | Chembrolu et al. | |
| 10,957,348 B2 | 3/2021 | Bai et al. | |
| 10,991,390 B2 | 4/2021 | Kobayashi | |
| 11,049,515 B1* | 6/2021 | Liu | G11B 5/1278 |
| 11,056,134 B1 | 7/2021 | Eppler | |
| 11,211,082 B1 | 12/2021 | Sasaki et al. | |
| 11,289,117 B1 | 3/2022 | Sasaki et al. | |
| 11,508,401 B1* | 11/2022 | Asif Bashir | G11B 5/3116 |
| 11,557,314 B1* | 1/2023 | Asif Bashir | G11B 5/235 |
| 11,631,423 B2 | 4/2023 | Nakagawa et al. | |
| 2003/0043490 A1* | 3/2003 | Clinton | G11B 5/127 |
| 2005/0280935 A1* | 12/2005 | Clinton | G11B 5/187 360/125.32 |
| 2008/0112087 A1* | 5/2008 | Clinton | G11B 5/314 |
| 2008/0117545 A1* | 5/2008 | Batra | G11B 5/02 |
| 2008/0205202 A1 | 8/2008 | Komura et al. | |
| 2008/0239541 A1 | 10/2008 | Shimazawa et al. | |
| 2008/0304176 A1 | 12/2008 | Takagishi et al. | |
| 2009/0059423 A1 | 3/2009 | Yamada et al. | |
| 2009/0109570 A1 | 4/2009 | Scholz et al. | |
| 2009/0152119 A1 | 6/2009 | Tachibana et al. | |
| 2009/0310244 A1 | 12/2009 | Shimazawa et al. | |
| 2013/0114384 A1 | 5/2013 | Mochizuki et al. | |
| 2013/0250456 A1 | 9/2013 | Yamada et al. | |
| 2014/0139952 A1 | 5/2014 | Takeo et al. | |
| 2014/0177092 A1 | 6/2014 | Katada et al. | |
| 2014/0177100 A1 | 6/2014 | Sugiyama et al. | |
| 2015/0092292 A1 | 4/2015 | Furukawa et al. | |
| 2016/0027455 A1 | 1/2016 | Kudo et al. | |
| 2016/0118065 A1 | 4/2016 | Chen et al. | |
| 2017/0092304 A1 | 3/2017 | Koizumi et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

OTHER PUBLICATIONS

Katayama et al. "Model Analysis of Tilted Spin-Torque Oscillator With Magnetic Write Head for Shingled Microwave-Assisted Magnetic Recording," IEEE Transactions on Magnetics, vol. 50, No. 11, Nov. 2014, 4 pages.

Koga et al. "Increasing AC-Field Frequency in Microwave-Assisted Magnetic Recording," Intermag, EQ-03, 2015, 1 page.

Zhu et al. "Microwave Assisted Magnetic Recording Utilizing Perpendicular Spin Torque Oscillator With Switchable Perpendicular Electrodes," IEEE Transactions on Magnetics, vol. 46, No. 3, Mar. 2010, pp. 751-757.

Ludeman "Three Technologies That Make HDD Magic—Western Digital Blog." Western Digital Corporate Blog, published on Jul. 16, 2020 in Tech & Products, 7 pages, https://blog.westerndigital.com/hdd-magic-20tb-18tb/.

* cited by examiner

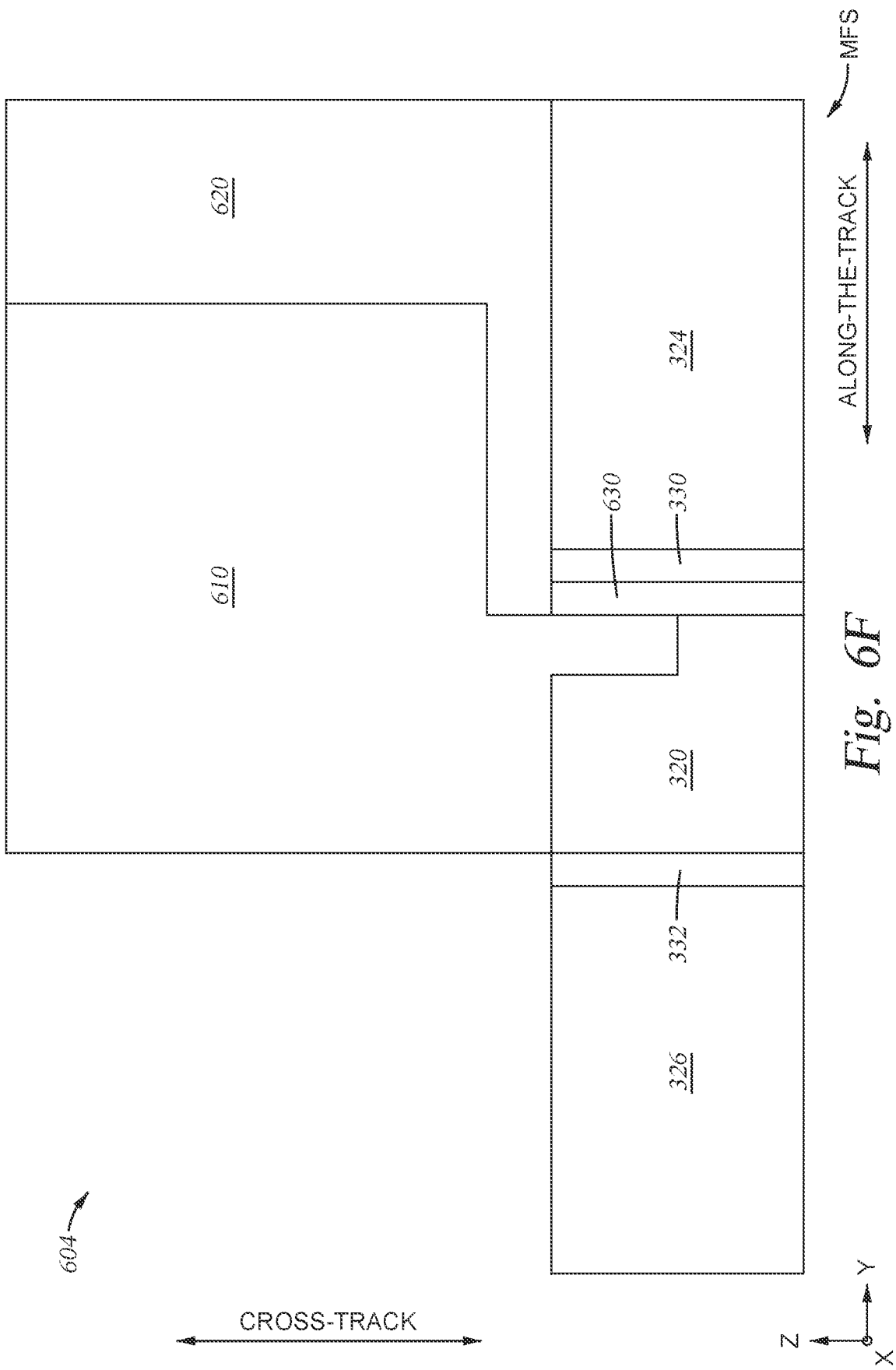

MAGNETIC RECORDING HEAD HAVING LEADS OVER THE TRAILING SHIELD FOR ASSISTING ELECTRIC CURRENTS

BACKGROUND OF THE DISCLOSURE

Field of the Disclosure

Embodiments of the present disclosure are generally related to a magnetic recording device comprising a magnetic recording head having a current flow in a cross-track direction through a trailing shield.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to conduct the main pole edge flux for improved pole tip field and flux gradient. However, in such designs the magnetic recording head cannot produce large magnetic fields for high areal density recording. High areal density recording requires narrow tracks, which require narrow main poles to write to the narrow tracks. As the main pole becomes narrower, the magnetic field generated by the magnetic recording head is lost.

Therefore, there is a need in the art for an improved current flow in the magnetic recording head to improve the magnetic field locally without the need to increase the size of the magnetic recording pole.

SUMMARY OF THE DISCLOSURE

The present disclosure is generally related to a magnetic recording device comprising a magnetic recording head having a first current flow in a cross-track direction through a trailing shield. In one or more embodiments, a second current flows in a cross-track direction around the main pole. The magnetic recording device comprises a main pole disposed between a trailing shield, a leading shield, and side shields. A trailing gap is disposed between the side shields and the trailing shield. A high moment seed layer is disposed above the main pole and the trailing shield. A first insulation layer is disposed within the trailing shield and directs the first current through the trailing shield, guided to the proximity of the main pole. A second insulation layer, disposed below the trailing shield, directs the second current through the trailing shield, or alternatively through the side shields and around the main pole.

In one embodiment, a magnetic recording head comprising: a main pole; a first side shield disposed adjacent to a first surface of the main pole; a second side shield disposed adjacent to a second surface of the main pole opposite the first surface; a high moment seed layer disposed adjacent to a third surface of the main pole; a trailing shield disposed over the third surface of the main pole, wherein: a first portion of the trailing shield is disposed adjacent to the first side shield; a second portion of the trailing shield is disposed adjacent to the second side shield; and a third portion of the trailing shield is disposed adjacent to the first portion, the second portion, and the high moment seed layer; a first lead disposed between the first portion of the trailing shield and the high moment seed layer; and a second lead disposed between the second portion of the trailing shield and the high moment seed layer.

In another embodiment, a magnetic recording drive comprising: a magnetic recording head, comprising: a main pole; a first side shield disposed adjacent to a first surface of the main pole; a second side shield disposed adjacent to a second surface of the main pole, the second surface being disposed opposite the first surface; a high moment seed layer disposed adjacent to a third surface of the main pole; a trailing shield disposed over the third surface of the main pole, wherein: a first portion of the trailing shield is disposed over the first side shield; a second portion of the trailing shield is disposed over the second side shield; and a third portion of the trailing shield is disposed over the first portion, the second portion, and the high moment seed layer; a first insulation layer disposed within the trailing shield; a leading shield disposed adjacent to a fourth surface of the main pole opposite the third surface of the main pole; and a second insulation layer disposed within the first side shield, the leading shield, and the second side shield; and means for flowing a current through the magnetic recording head.

In yet another embodiment, a magnetic recording head comprising: a main pole; a first side shield disposed adjacent to a first surface of the main pole; a second side shield disposed adjacent to a second surface of the main pole opposite the first surface of the main pole; a trailing shield disposed over a third surface of the main pole, wherein: a first portion of the trailing shield is disposed over the first side shield; a second portion of the trailing shield is disposed over the second side shield; and a third portion of the trailing shield is disposed over the first portion, the second portion, and a third surface of the main pole; an insulation layer disposed adjacent to the trailing shield; a first lead disposed over the first portion of the trailing shield; and a second lead disposed over the second portion of the trailing shield.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6F illustrate various views of a magnetic recording head assembly, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
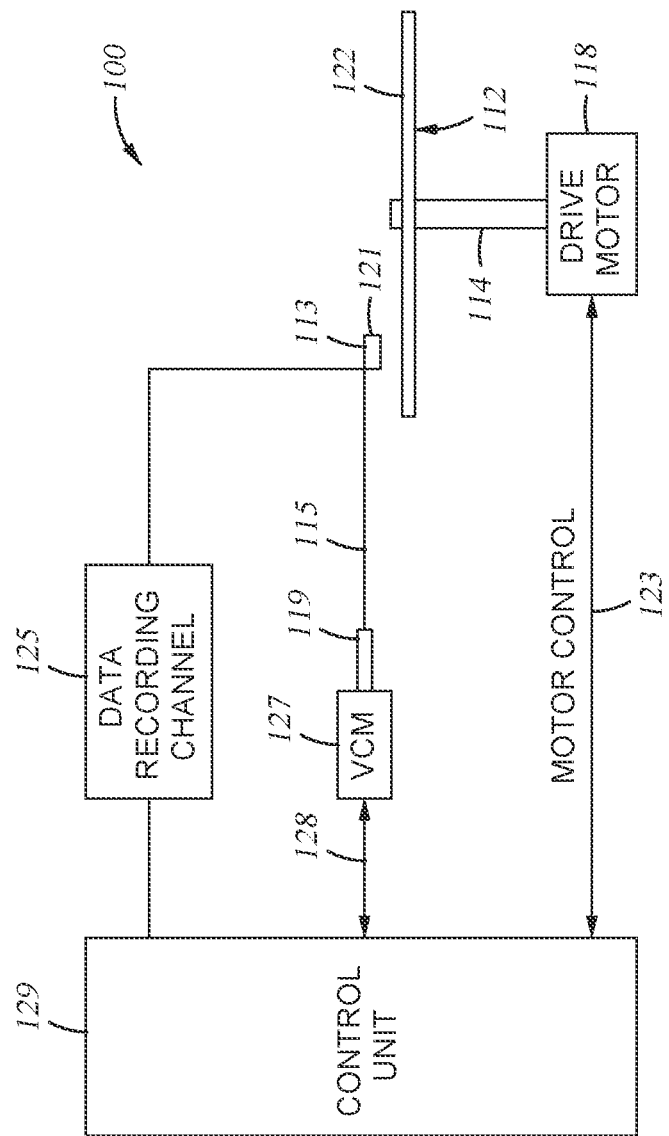
FIG. 1 illustrates a magnetic recording device embodying the disclosure.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a magnetic recording device comprising a magnetic recording head having a first current flow in a cross-track direction through a trailing shield. In one or more embodiments, a second current flows in a cross-track direction around the main pole. In various embodiments, during writing a bias current is directed in a cross-track direction (1) on the trailing side of the main pole, and/or (2) around the leading side of the main pole. This facilitates generating a magnetic field in a downtrack direction, yielding improved downtrack gradient and cross-track gradient of the magnetic field. Among other beneficial effects, the magnetic bias field in the downtrack direction facilitates enhanced writing performance (e.g., jitter reduction) and increased areal density capability (ADC) for magnetic recording. In one embodiment, the magnetic bias field is an alternating current (AC) bias field that is driven in a range of 0 GHz to 25 GHz using an external AC source, and a DC source may be used in other embodiments. The cross-track current scheme and associated external current generation circuitries are further described in U.S. patent application Ser. No. 17/183,155, filed Feb. 23, 2021, and titled "MAGNETIC RECORDING DEVICES HAVING CROSS-TRACK CURRENT FLOW TO FACILITATE DOWNTRACK MAGNETIC FIELD ENHANCEMENTS," and U.S. patent application Ser. No. 17/183,161, filed Feb. 23, 2021, and titled "MAGNETIC RECORDING DEVICES HAVING EXTERNAL ALTERNATING CURRENT SOURCES," the disclosures of which are incorporated by reference.

The magnetic recording device comprises a main pole disposed between a trailing shield, a leading shield, and side shields. A trailing gap is disposed between the side shields and the trailing shield. A high moment seed layer is disposed between the main pole and the trailing shield. A first insulation layer is disposed within the trailing shield and directs the first current through the trailing shield, guided to the proximity of the main pole. A second insulation layer, disposed below the trailing shield, directs the second current through the trailing shield, or alternatively through the side shields and around the main pole.

FIG. 1 illustrates a disk drive 100 embodying the disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one position slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the magnetic media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the magnetic media 112. The AC magnetic field generated from the magnetic head assembly 121 is a bias field generated using a bias current supplied using an external AC or DC source. The bias field facilitates enhanced writing performance of a write field generated using the write current.

The various components of the disk drive 100 are controlled in operation by control signals generated by the control unit 129, such as access control signals and internal clock signals. The control unit 129 can include logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
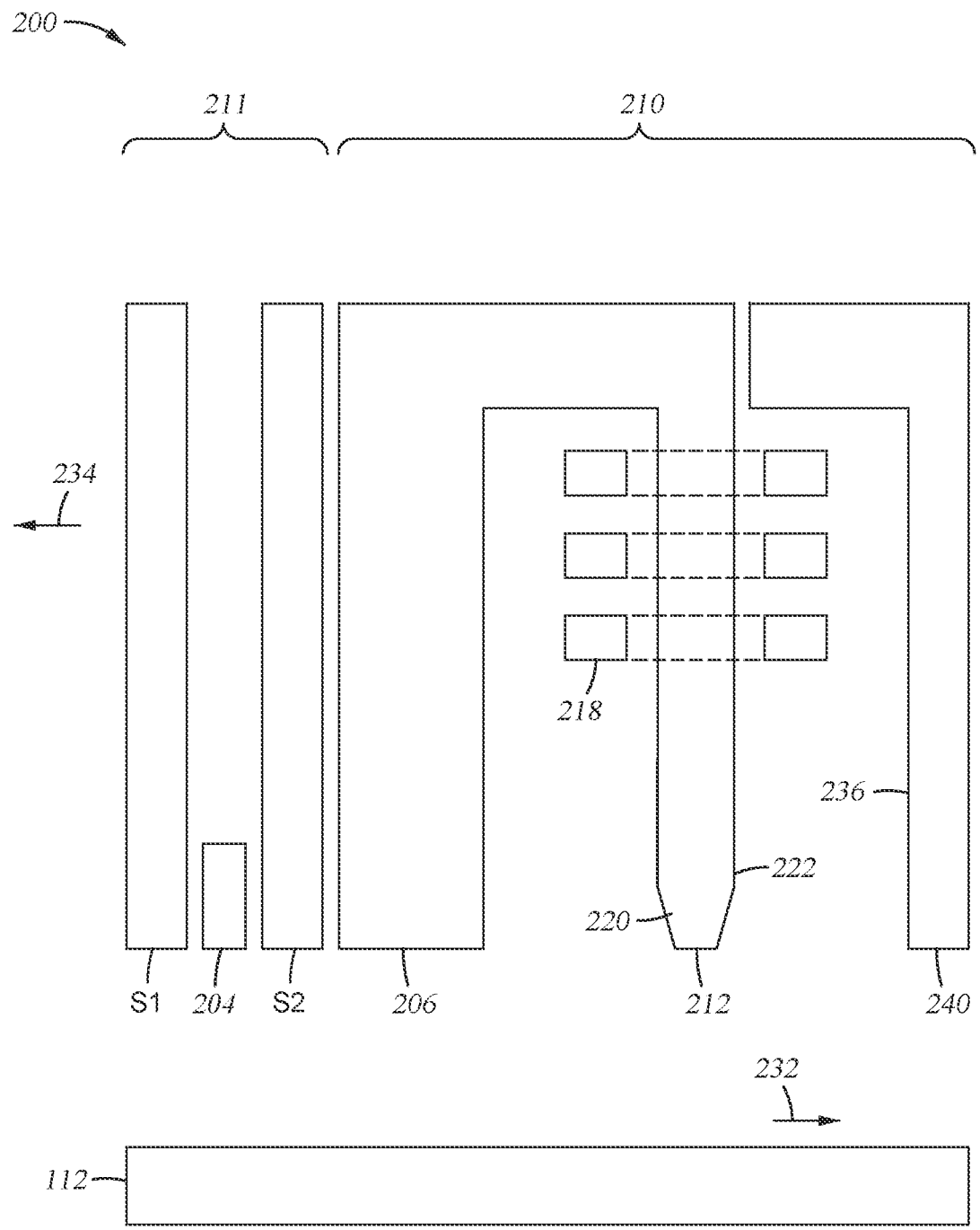
FIG. 2 is a fragmented, cross-sectional side view through the center of a read/write head facing magnetic media, according to one embodiment.

FIG. 2 is a fragmented and schematic cross-sectional side view through a center of a read/write head 200 facing the magnetic media 112, according to one implementation. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 such that the read/write head 200 moves relative to the magnetic media 112 in the direction indicated by the arrow 234.

In one embodiment, which can be combined with other embodiments, the magnetic read head 211 is a magnetoresistive (MR) read head that includes an MTJ sensing element 204 located between MR shields S1 and S2. In one embodiment, which can be combined with other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap and a leading gap may be in contact with the main pole, and a leading shield may be in contact with the leading gap. A recording magnetic field (i.e., a write field or a primary field) is generated from the main pole 220 and the trailing shield 240 facilitates making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, which can be combined with other embodiments, the main pole 220 has a saturated magnetization (Ms) of 2.4 T and a thickness of about 300 nanometers (nm). The trailing shield 240 may be a magnetic material such as NiFe alloy. In one embodiment, which can be combined with other embodiments, the trailing shield 240 has an Ms of about 1.2 T to about 1.6 T.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

Figure 3A:
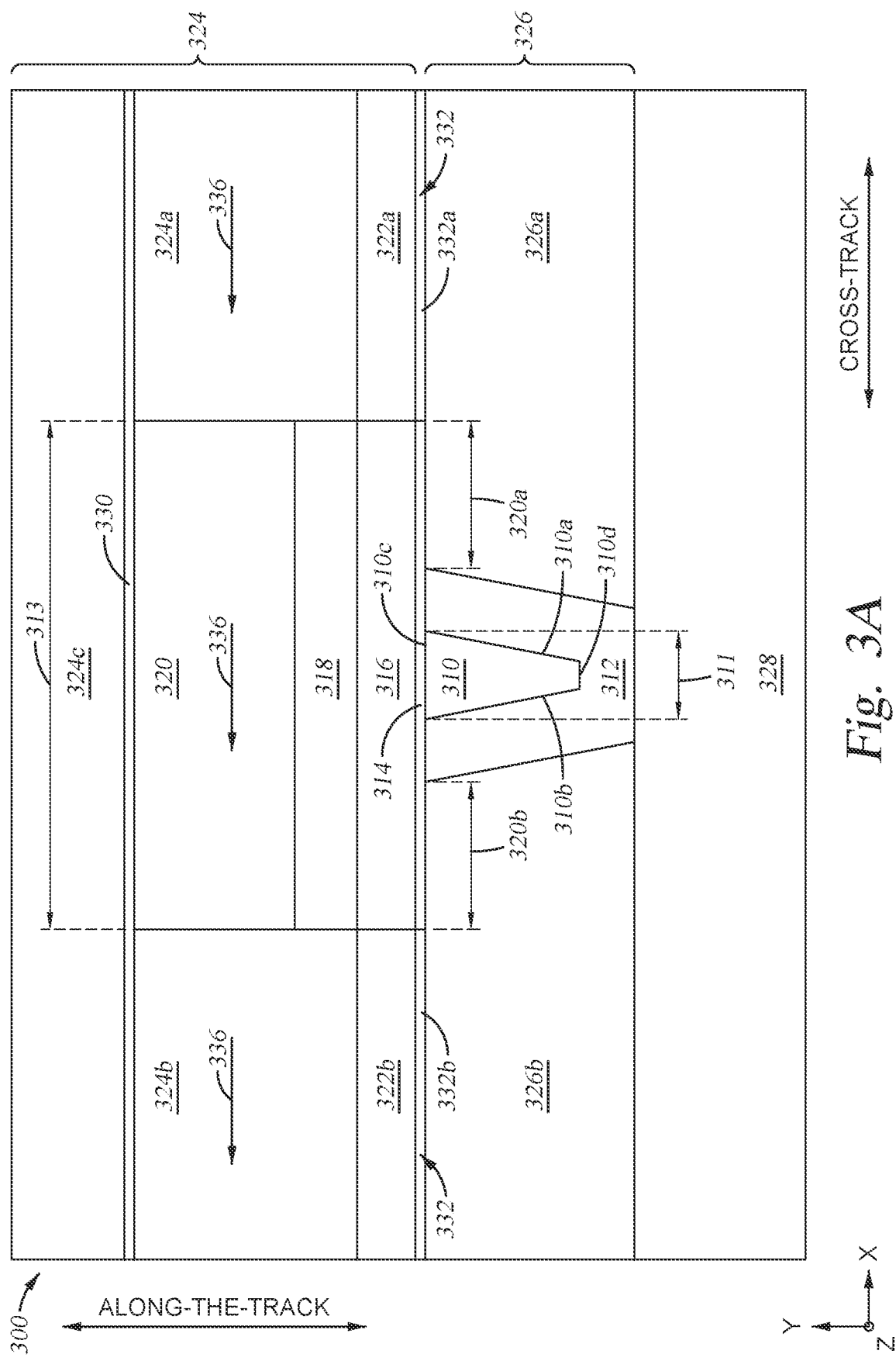
FIGS. 3A and 3B illustrate various views of a magnetic recording head assembly, according to one embodiment.
Figure 3B:
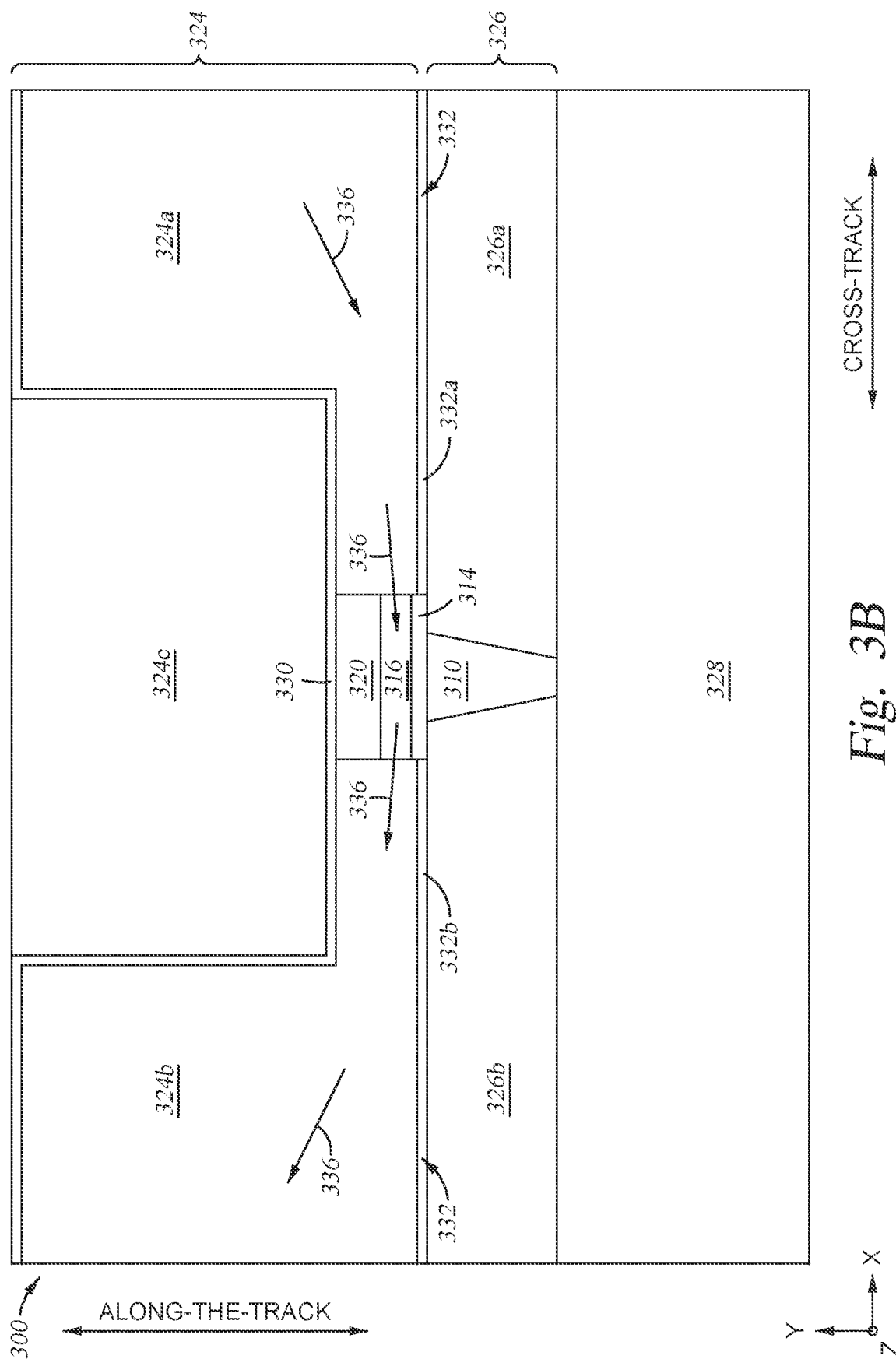

FIGS. 3A and 3B illustrate various views of a magnetic recording head 300, according to one embodiment. FIG. 3A is a zoomed-in, media facing surface (MFS) view of the magnetic recording head 300, at the area surrounding the main pole while FIG. 3B provides a wider MFS view. The magnetic recording head 300 may be the write head 210 of FIG. 2. The magnetic recording head 300 may be within a magnetic recording device, such as the magnetic recording device 100 of FIG. 1.

Referring to FIG. 3A, the magnetic recording head 300 comprises a main pole 310 disposed between a trailing shield 324 and a leading shield 328 in the y-direction, and between a first side shield 326a and a second side shield 326b in the x-direction. The first side shield 326a and the second side shield 326b may be collectively referred to as the side shields 326. The first side shield 326a is disposed adjacent to a first surface 310a of the main pole 310. The second side shield 326b is disposed adjacent to a second surface 310b of the main pole 310. The first surface 310a of the main pole 310 is disposed opposite the second surface 310b of the main pole 310 in the x-direction. The trailing shield 324 is disposed adjacent to a third surface 310c of the main pole 310. The leading shield 328 is disposed adjacent to a fourth surface 310d of the main pole 310. The third surface 310c is disposed opposite the fourth surface 310d of the main pole 310 in the y-direction. The third surface 310c has a first width 311 in the x-direction.

A side gap 312 is disposed adjacent to the first surface 310a of the main pole 310, the second surface 310b of the main pole 310, and the fourth surface 310d of the main pole 310. The side gap 312 surrounds the main pole 310, separating the main pole 310 from the side shields 326. The side gap 312 comprises an insulating material such as silicon nitride (SiN). A first trailing gap 322a is disposed between the first side shield 326a and the trailing shield 324 in the y-direction. A second trailing gap 322b is disposed between the second side shield 326b and the trailing shield 324 in the y-direction. The first trailing gap 322a and the second trailing gap 322b separate the side shields 326 from the trailing shield 324. A low resistance layer 316 comprising a material having a low electrical resistivity is disposed between the first trailing gap 322a and the second trailing gap 322b in the x-direction, and between the trailing shield 324 and the third surface 310c of the main pole 310 in the y-direction. The low resistance layer 316 has a second width 313 in the x-direction, wherein the second width 313 is greater than the first width 311 of the main pole 310. The low resistance material may comprise cobalt (Co), ruthenium (Ru), or a combination thereof.

The trailing shield 324 comprises a first portion 324a disposed above the first trailing gap 322a, a second portion 324b disposed above the second trailing gap 322b, a high moment seed layer 320 disposed between the first portion 324a and the second portion 324b in the x-direction, and a third portion 324c disposed above the first portion 324a, the high moment seed layer 320, and the second portion 324b. The first portion 324a, the second portion 324b, and the third portion 324c of the trailing shield 324 each comprise the same material, such as nickel iron (NiFe) or cobalt iron (CoFe) alloys. The high moment seed layer 320 may comprise CoFe or alloys thereof.

The high moment seed layer 320 comprises a bump layer 318 disposed above and in contact with the low resistance layer 316 (i.e. the width of the high moment seed layer 320 is equivalent to the second width 313 of the low resistance layer 316). The bump layer 318 is a high moment layer which is used to enhance field gradient in the first and second trailing gaps 322a, 322b. The bump layer 318 may comprise CoFe or alloys thereof. The high moment seed layer 320 and the low resistance layer 316 each comprises a first overhang portion 320a extending in the x-direction over the first side shield 326a away from the main pole 310, wherein the first overhang portion 320a has a width of about 100 nm to about 500 nm, and a second overhang portion 320b extending in the x-direction over the second side shield 326b away from the main pole 310, wherein the second overhang portion has a width of about 100 nm to about 500 nm.

In some embodiments, the magnetic recording head 300 comprises a blocker layer 314 disposed in contact with a third surface 310c of the main pole 310. The blocker layer 314 is further disposed between the third surface 310c of the main pole 310 and the low resistance layer 316 (i.e. the blocker layer 314 is equal to the second width 313 of the low resistance layer 316). The blocker layer 314 blocks current from flowing in the y-direction to the main pole 310. The blocker layer 314 may comprise an insulation material, such as SiN.

The first side shield 326a is disposed below the below the first portion 324a of the trailing shield 324 and adjacent to the first surface 310a of the main pole 310. The second side shield 326b is disposed below the second portion 324b of the trailing shield 324 and adjacent to the second surface 310b of the main pole 310. The first side shield 326a and the second side shield 326b each comprises the same material such as NiFe or CoFe alloys.

The magnetic recording head 300 further comprises a first insulation layer 330 disposed above the high moment seed layer, wherein at least a portion of the first insulation later is further disposed below the third portion 324c of the trailing shield 324, separating the third portion 324c of the trailing shield 324 from the first portion 324a and the second portion 324b of the trailing shield 324 and the high moment seed layer 320. In other words, the first insulation layer 330 divides the trailing shield 324 into two or more portions 324a, 324b, 324c. The first insulation layer 330 comprises a non-conductive material such as SiN.

A second insulation layer 332 is disposed below the trailing shield 324. The second insulation layer 332 comprises a first portion 332a disposed between the first side shield 326a and the first trailing gap 322a in the y-direction and a second portion 332b disposed between the second side shield 326b and the second trailing gap 322b in the y-direction. The first portion 332a of the second insulation layer 332 extends from the end of the first overhang portion 320a in the x-direction above the first side shield 326a. The second portion 332b of the second insulation layer 332 extends from the end of the second overhang portion 320b in the x-direction above the second side shield 326b. The second insulation layer 332 provides additional separation between the trailing shield 324 and the side shields 326. The second insulation layer 332 comprises a non-conductive material such as SiN.

FIG. 3B illustrates a wider MFS view of the magnetic recording head 300 of FIG. 3A, including beyond the area surrounding the main pole shown in FIG. 3A. FIG. 3B illustrates the first insulation layer 330 disposed between the third portion 324c of the trailing shield 324 and first portion 324a and the second portion 324b of the trailing shield 324, such that the first insulation layer 330 separates the third portion 324c from the rest of the trailing shield 324. It is to be understood that although the first insulation layer 330 is shown as not passing through either the first portion 324a, the second portion 324b, or the third portion 324c of the trailing shield 324, the first insulation layer 330 may alternatively be disposed below the third portion 324c of the trailing shield 324 and pass through the first portion 324a and the second portion 324b of the trailing shield 324 so that the first insulation layer 330 does not form right angles. As such, the first insulation layer 330 may pass through the first portion 324a and the second portion 324b of the trailing shield 324 in a straight line or at an angle, resulting in part of the first portion 324a and part of the second portion 324b of the trailing shield 324 disposed above the first insulation layer 330. In other words, the first insulation layer 330 divides the trailing shield 324 into two or more portions 324a, 324b, 324c. Furthermore, the various right angles of the first insulation layer 330 may instead be rounded or slanted. While not shown in FIG. 3B, the high moment seed layer 320 comprises the bump layer 318.

During operation, the magnetic recording head 300 is configured to permit or direct a first current 336 to flow from the first portion 324a of the trailing shield 324 through the high moment seed layer 320 to the second portion 324b of the trailing shield 324, or permit or direct the first current 336 to flow from the second portion 324b of the trailing shield 324 through the high moment seed layer 320 to the first portion 324a of the trailing shield 324. The first insulation layer 330 isolates the first current 336 from the third portion 324c of the trailing shield 324 so that the first current 336 will flow through the first portion 324a of the trailing shield 324 and the second portion 324b of the trailing shield 324, into the high moment seed layer 320, and across the third surface 310c of the main pole 310. As such, the first insulation layer 330 prevents the first current 336 from flowing or dissipating into the third portion 324c of the trailing shield 324. The second insulation layer 332 isolates the first current 336 from the side shields 326, preventing the first current 336 from flowing or dissipating into the side shields 326. As such, the current will flow through the trailing shield 324. The low resistance layer 316 helps direct the first current 336 to flow near the third surface 310c of the main pole 310 without flowing into the main pole 310 itself. In embodiments comprising a blocker layer 314, the blocker layer 314 prevents the first current 336 from flowing into the main pole and the side shields 326.

Figure 3C:
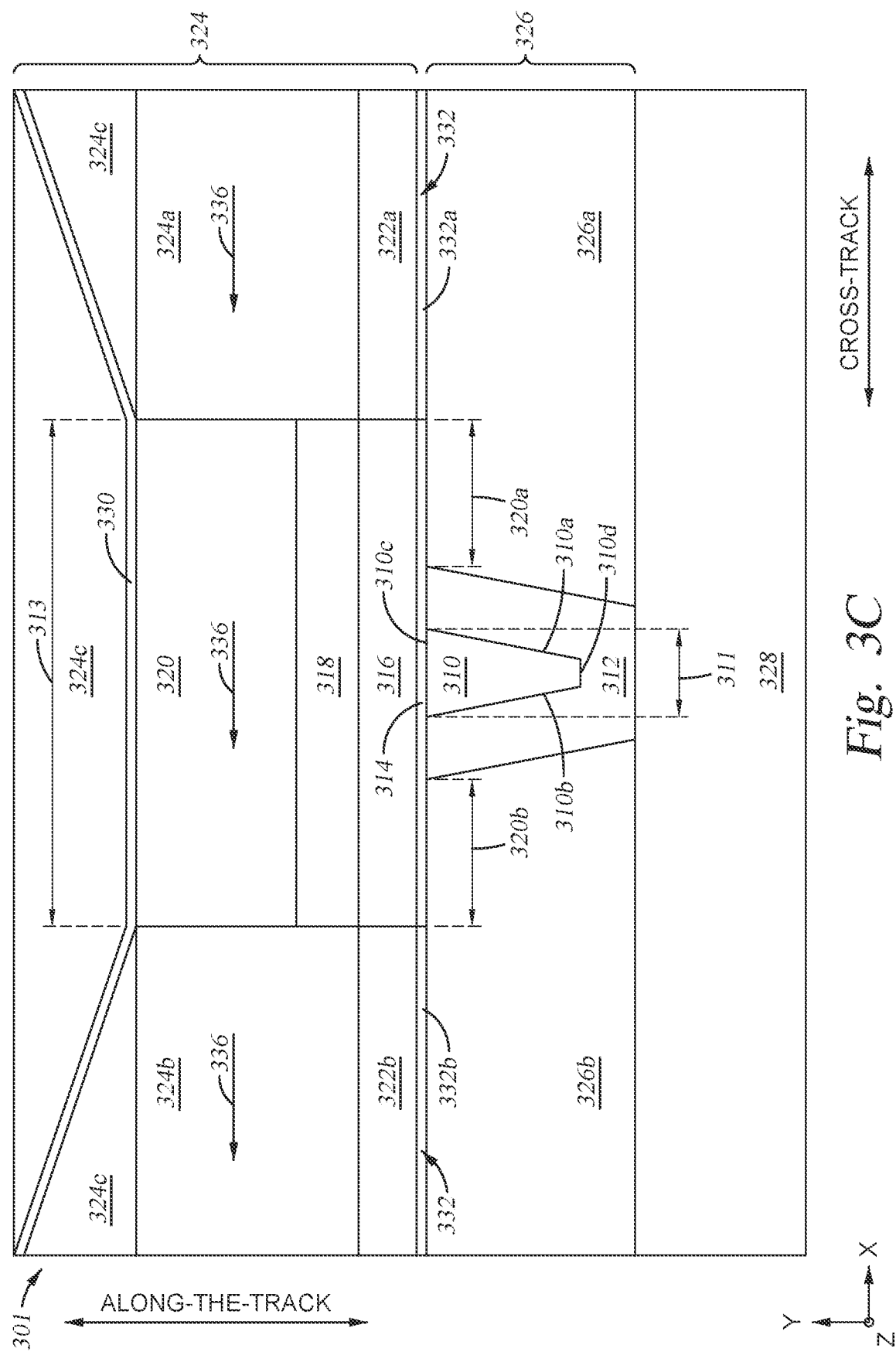
FIGS. 3C-3E illustrate various views of a magnetic recording head assembly, according to various embodiments.

FIG. 3C illustrates a MFS view of a magnetic recording head 301, according to another embodiment. The magnetic recording head 301 is the same as the magnetic recording head 300 of FIGS. 3A and 3B; however, the first insulation layer 330 differs. In the magnetic recording head 301, the first insulation layer 330 is disposed within the third portion 324c of the trailing shield 324. It is to be understood that although the first insulation layer 330 is shown as passing through the third portion 324c of the trailing shield 324 at a particular angle, the first insulation layer 330 may pass through the third portion 324c of the trailing shield 324 at any angle. As such, varying amounts of the third portion 342c of the trailing shield 324 may be disposed above and below the first insulation layer 330. In other words, the first insulation layer 330 divides the trailing shield 324 into two or more portions 324a, 324b, 324c.

In this configuration, a portion of the current can dissipate or flow through a third portion 324c that is below the first insulation layer 330 in the y-direction (at either ends in the x-direction). During operation, the magnetic recording head 301 is configured to permit or direct a first current 336 to flow from the first portion 324a and one such third portion 324c of the trailing shield 324 (i.e., the portion of the trailing shield 324 disposed below the first insulation layer 330 in the y-direction) through the high moment seed layer 320 to the second portion 324b and another such third portion 324c of the trailing shield 324, or permit or direct the first current 336 to flow from the second portion 324b and one such third portion 324c of the trailing shield 324 through the high moment seed layer 320 to another such first portion 324a and to the third portion 324c of the trailing shield 324.

It is to be understood that although the magnetic recording head 301 is shown to comprise a blocker layer 314 like that of the magnetic recording head 300 of FIG. 3A, the magnetic recording head 301 may alternatively comprise the third surface 310c of the main pole 310 in direct contact with the low resistance layer 316.

Figure 3D:
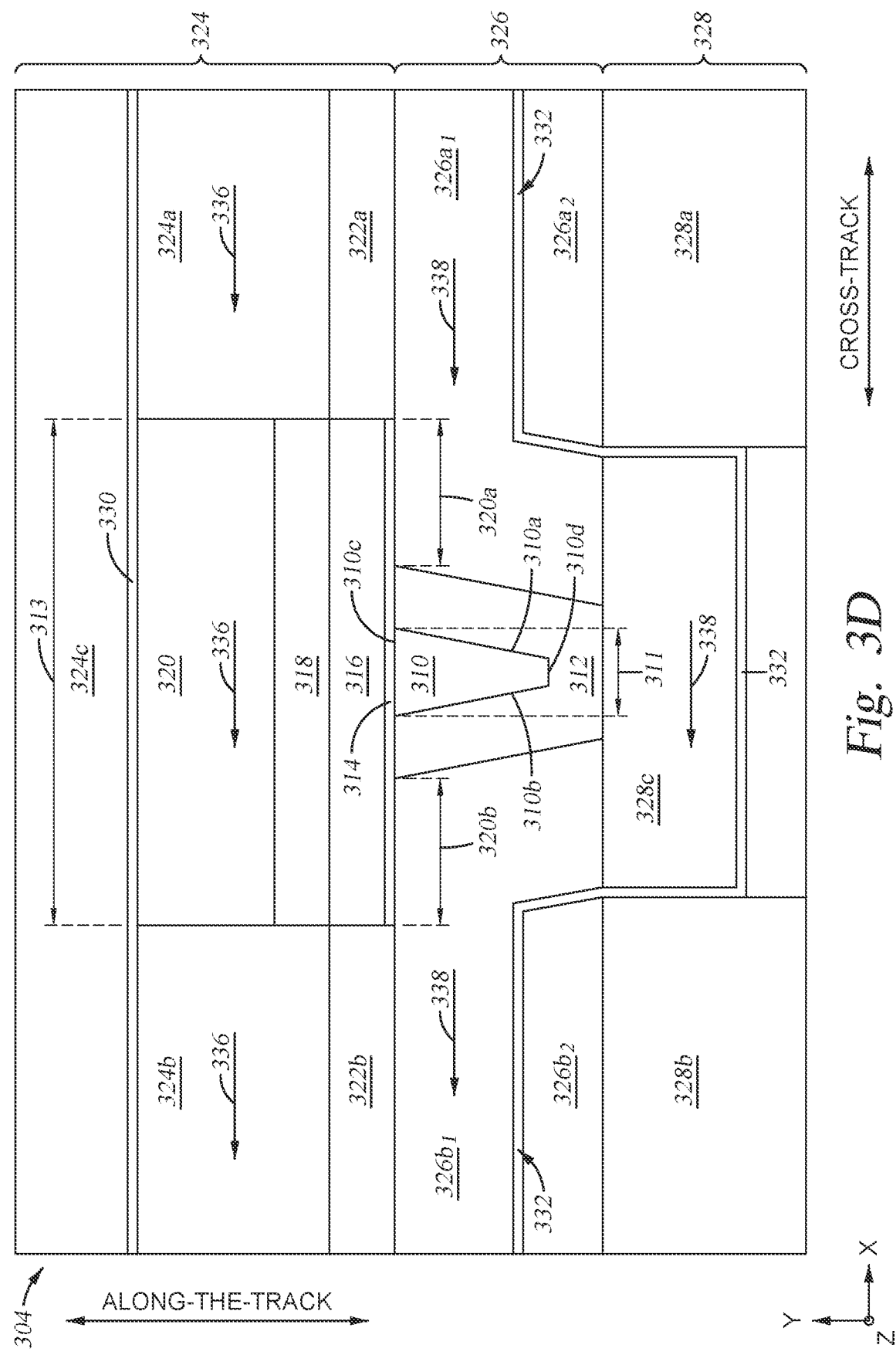
Figure 3E:
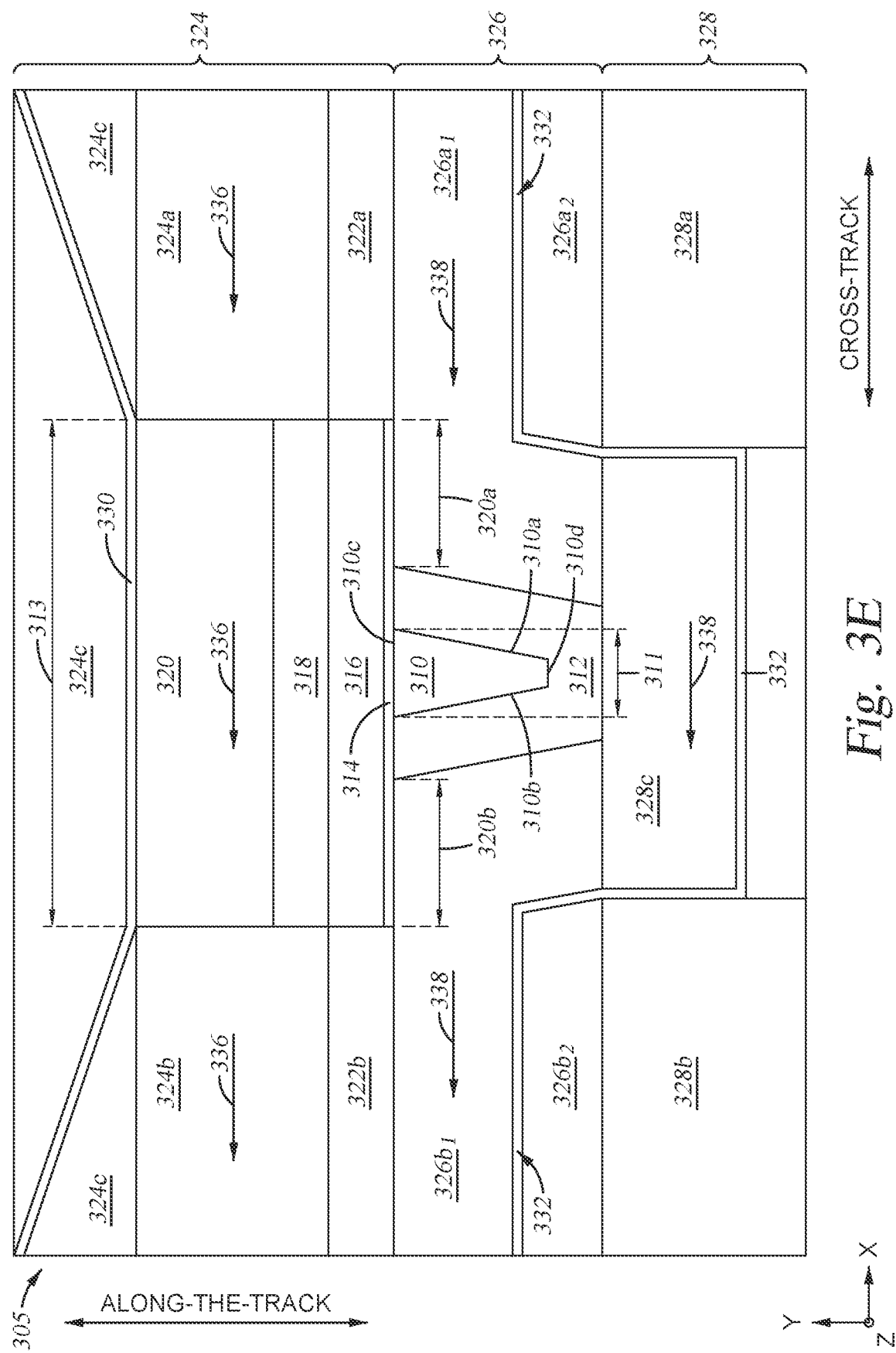

FIGS. 3D and 3E illustrate the MFS view of different magnetic recording heads with the additional option of side shield current paths, according to various embodiments. FIG. 3D is a MFS view of the magnetic recording head 304, according to another embodiment. The magnetic recording head 304 is the same as the magnetic recording head 300 of FIGS. 3A and 3B; however, the second insulation layer 332 differs, permitting an additional side shield current path. In the magnetic recording head 304, the second insulation layer 332 is disposed within the side shields 226 and the leading shield 328. The second insulation layer 332 passes through the first side shield in the x-direction, angles or curves down in the y-direction to pass through the first side shield 326a and the leading shield 328, cuts through the leading shield 328 in the x-direction, angles or curves up in the y-direction to pass through the leading shield 328 into the second side shield 326b, and through the second side shield 326b in the x-direction.

The first side shield 326a comprises a first portion 326ai and a second portion 326a2. The first portion 326ai of the first side shield 326a is disposed below the below the first portion 324a of the trailing shield 324 and adjacent to the first surface 310a of the main pole 310. The second portion 326a2 of the first side shield 326a is disposed between the first portion 326ai of the first side shield 326a and the leading shield 328 in the y-direction. The second side shield 326b comprises a first portion 326bi and a second portion 326b2. The first portion 326bi of the second side shield 326b is disposed below the second portion 324b of the trailing shield 324 and adjacent to the second surface 310b of the main pole 310. The second portion 326b2 of the second side shield 326b is disposed between the first portion 326bi of the second side shield 326b and the leading shield 328 in the y-direction. The first side shield 326a and the second side shield 326b each comprises the same material, such as NiFe or CoFe alloys. Thus, the first portion 326ai and a second portion 326a2 of first side shield 326a, and the first portion 326bi and a second portion 326b2 of the second side shield 326b each comprises the same material.

The leading shield 328 comprises a first portion 328a disposed below the first side shield 326a, a second portion 328b disposed below the second side shield 326b, and a third portion 328c disposed adjacent to the fourth surface 310d of the main pole 310, and further disposed between the first potion 328a and the second portion 328b of the leading shield 328. The first portion 328a, the second portion 328b, and the third portion 328c of the leading shield 328 each comprises the same material.

As such, the portion of the second insulation layer 332 that passes through the first side shield 326a is further disposed between the first portion 326ai and the second portion 326a2 of the first side shield 326a in the y-direction. The portion of the second insulation layer 332 that passes down in the y-direction through the first side shield 326a to the leading shield 328 is further disposed between the first portion 326ai and the second portion 326a2 of the first side shield 326a in the x-direction and between the first portion 328a and the third portion 328c of the leading shield 328 in the x-direction. The portion of the second insulation layer 332 that passes through the leading shield 328 is further disposed within the third portion 328c of the leading shield 328. The portion of the second insulation layer 332 that that passes up in the y-direction through the leading shield 328 and the second side shield 326b is further disposed between the first portion 326bi and the second portion 326b2 of the second side shield 326b in the x-direction and between the second portion 328b and the third portion 328c of the leading shield 328. The portion of the second insulation layer 332 that that passes through the second side shield 326b is further disposed between the first portion 326bi and the second portion 326b2 of the second side shield 326b in the y-direction. As such, the second insulation layer 332 is shaped to approximately follow the shape of the main pole 310.

In other words, the second insulation layer 332 separates the first portion 326ai and the second portion 326a2 of the first side shield 326a, separates the sections of the first portion 328a and the third portion 328c of the leading shield 328, separates the sections of the second portion 328b and the third portion 328c of the leading shield 328, and separates the first portion 326bi and the second portion 326b2 of the second side shield 326b. While the second insulation layer 332 is shown to have a number of right angles, the second insulation layer 332 may instead be curved or slanted. In other words, the second insulation layer 332 divides the leading shield 328 and/or first and second side shields 326a, 326b into two or more portions.

During operation, the magnetic recording head 304 is configured to permit or direct a first current 336 to flow through the trailing shield 324 like the magnetic recording head 300 of FIGS. 3A and 3B. However, the magnetic recording head 304 is configured to further permit or direct a second current 338 to flow from the first side shield 326a, through the leading shield 328, around the main pole 310, to the second side shield 326b, or alternatively from the second side shield 326b, through the leading shield 328, around the main pole 310, to the first side shield 326a. The second insulation layer 332 helps direct the second current 338 through the first portion 326ai of the first side shield 326a, through the first portion 326bi of the second side shield 326b, through the third portion 328c of the leading shield, and around the main pole 310. A portion of the second current 338 dissipates or flows through the third portion 328c of the leading shield 328; however, a greater portion of the second current 338 (i.e. the majority) flows through the first side shield 326a and the second side shield 326b because the second insulation layer 332 helps direct the second current 338 through the first side shield 326a, the second side shield 326b and around the main pole 310.

FIG. 3E is a MFS view of the magnetic recording head 305, according to yet another embodiment. The magnetic recording head 305 is the same as the magnetic recording head 304 of FIG. 3D and likewise provides the side shield current option; however, the first insulation layer 330 differs. The first insulation layer 330 is shown to be like that of the magnetic recording head 301 of FIG. 3C. As such, like the magnetic recording head 301 of FIG. 3C, the first insulation layer 330 helps direct a first current 336 through the first portion 324a and the third portion 324c of the trailing shield 324 (that is under first insulation layer 330) through the high moment seed layer 320, to the second portion 324b and the third portion 324c of the trailing shield 324 (that is under first insulation layer 330), or in an opposite direction as noted above. The second insulation layer 332 helps direct the second current 338 through the first portion 326ai of the first side shield 326a, through the first portion 326bi of the second side shield 326b, through the third portion 328c of the leading shield, and around the main pole 310, or in an opposite direction as noted above.

Figure 4:
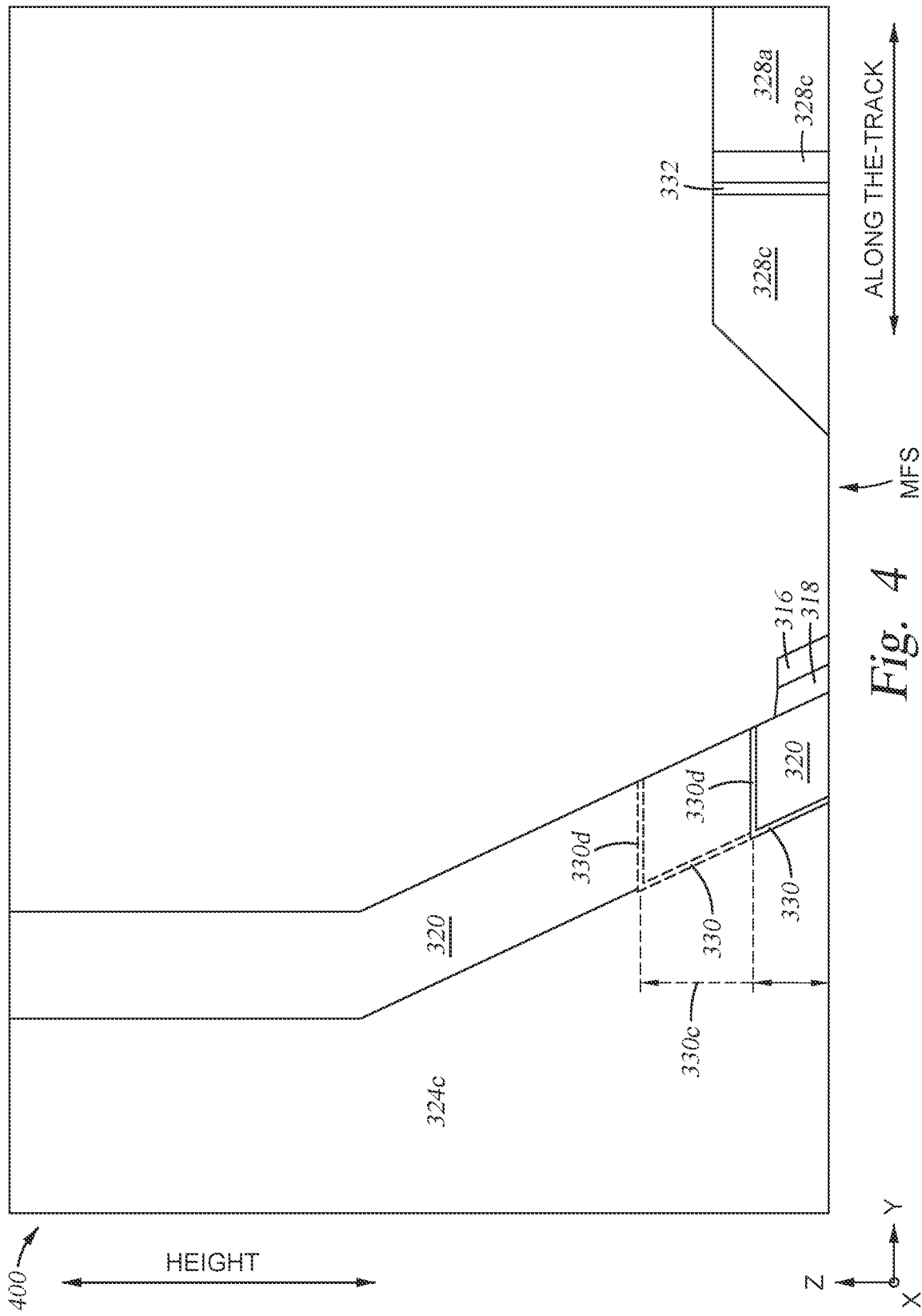
FIG. 4 illustrates a MFS cross-sectional view of a magnetic recording head assembly, according to one embodiment.

FIG. 4 illustrates a cross-sectional view of a magnetic recording head 400, according to one embodiment. The magnetic recording head 400 may be the write head 210 of FIG. 2. The magnetic recording head 400 may be within a magnetic recording device, such as the magnetic recording device 100 of FIG. 1. It is to be understood that the magnetic recording head 400 may comprise or be used in combination with any of the magnetic recording head 300 of FIGS. 3A and 3B, the magnetic recording head 301 of FIG. 3C, the magnetic recording head 304 of FIG. 3D, and/or the magnetic recording head 305 of FIG. 3E.

In the magnetic recording head 400, the first insulation layer 330 is disposed between the high moment seed layer 320 and the third portion of the trailing shield 324c in the y-direction. The first insulation layer 330 has a height 330c in the z-direction of about 30 nm to about 100 nm. The height 330c of the first insulation layer 330 may be adjusted for optimal current resistance, as shown by the dotted line. In one or more embodiments, the first insulation layer 330 may also comprise a portion 330d disposed within the high moment seed layer 320 extending across the length of the high moment seed layer 320 in the y-direction.

It is to be understood that although the second insulation layer 332 is shown disposed within the third portion 328c of the leading shield 328, the second insulation layer 332 may alternatively be disposed within the side shields 326 (not shown) as illustrated in the magnetic recording head 300 of FIGS. 3A and 3B, the magnetic recording head 301 of FIG. 3C, the magnetic recording head 304 of FIG. 3D, or the magnetic recording head 305 of FIG. 3E.

Having described the various embodiments related to insulator layers and current path arrangements, the following figures and description will show placement of leads (electrical contacts) and associated configurations, according to various embodiments.

Figure 5:
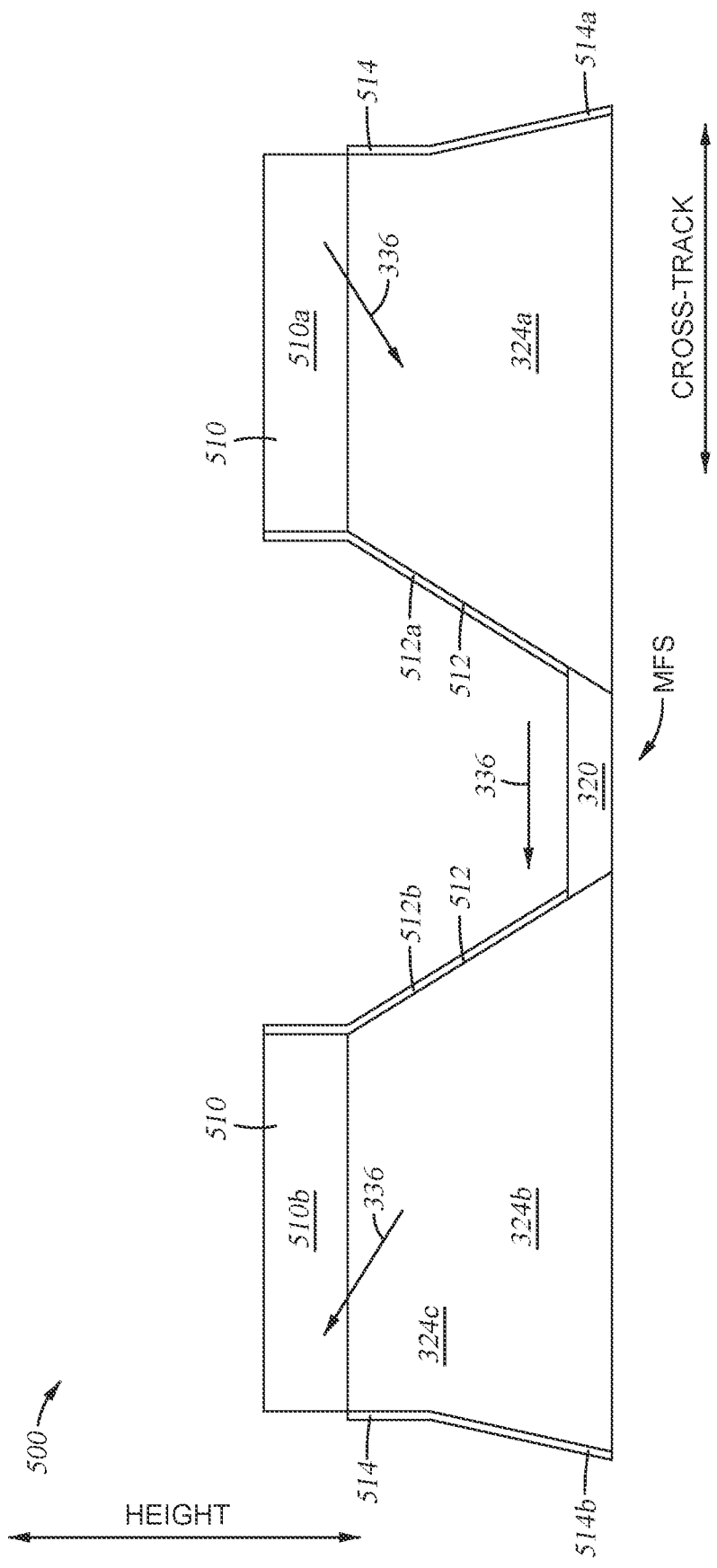
FIG. 5 illustrates a cross-track cross-section view of a magnetic recording head assembly, according to another embodiment.

FIG. 5 illustrates a cross-track cross sectional view of a magnetic recording head 500, according to another embodiment. The magnetic recording head 500 may be the write head 210 of FIG. 2. The magnetic recording head 500 may be within a magnetic recording device, such as the magnetic recording device 100 of FIG. 1. It is to be understood that the magnetic recording head 500 may comprise or be used in combination with any of the magnetic recording head 300 of FIGS. 3A and 3B, the magnetic recording head 301 of FIG. 3C, the magnetic recording head 304 of FIG. 3D, and/or the magnetic recording head 305 of FIG. 3E.

The magnetic recording head 500 comprises a first lead 510a disposed in contact with the first portion 324a of the trailing shield 324 and a second lead 510b disposed in contact with the second portion 324b of the trailing shield 324. The first lead 510a and the second lead 510b may be collectively referred to as the leads 510. The leads 510 are recessed from the MFS. A third insulation layer 512 comprising a first portion 512a and a second portion 512b is disposed adjacent to the trailing shield 324. The first portion 512a is disposed in contact with the first lead 510a and angles or curves down in the −z-direction through the first portion 324a of the trailing shield 324 to contact the high moment seed layer 320. The second portion 512b is disposed in contact with the second lead 510b and angles or curves down in the −z-direction through the second portion 324b of trailing shield 324 to contact the high moment seed layer 320. A fourth insulation layer 514 comprises a first portion 514a and a second portion 514b disposed adjacent to the trailing shield 324. The first portion 514a of the fourth insulation layer is disposed opposite the first portion 512a of third insulation layer 512 on the outer edge of the first portion 324a of the trailing shield 324. The second portion 514b of the fourth insulation layer is disposed opposite the second portion 512b of the third insulation layer 512 on the outer edge of the second portion 324b of the trailing shield 324.

During operation, leads 510 are configured to flow a first current 336 from the first lead 510a through the trailing shield 324, the high moment seed layer 320, and across the third surface 310c of the main pole 310 (not shown) to the second lead 510b, or from the second lead 510b through the trailing shield 324, the high moment seed layer 320, and across the third surface 310c of the main pole 310 (not shown) to the first lead 510a. The third insulation layer 512 and the fourth insulation layer 514 help direct the first current 336 through trailing shield 324, into the high moment seed layer 320 and across the third surface 310c of the main pole 310 (not shown).

FIGS. 6A-6F illustrate various views of a magnetic recording head 600, according to various embodiments. The magnetic recording head 600 may be the write head 210 of FIG. 2. The magnetic recording head 600 may be within a magnetic recording device, such as the magnetic recording device 100 of FIG. 1. It is to be understood that the magnetic recording head 600 may comprise or be used in combination with any of the magnetic recording head 300 of FIGS. 3A and 3B, the magnetic recording head 301 of FIG. 3C, the magnetic recording head 304 of FIG. 3D, and/or the magnetic recording head 305 of FIG. 3E.

Figure 6A:
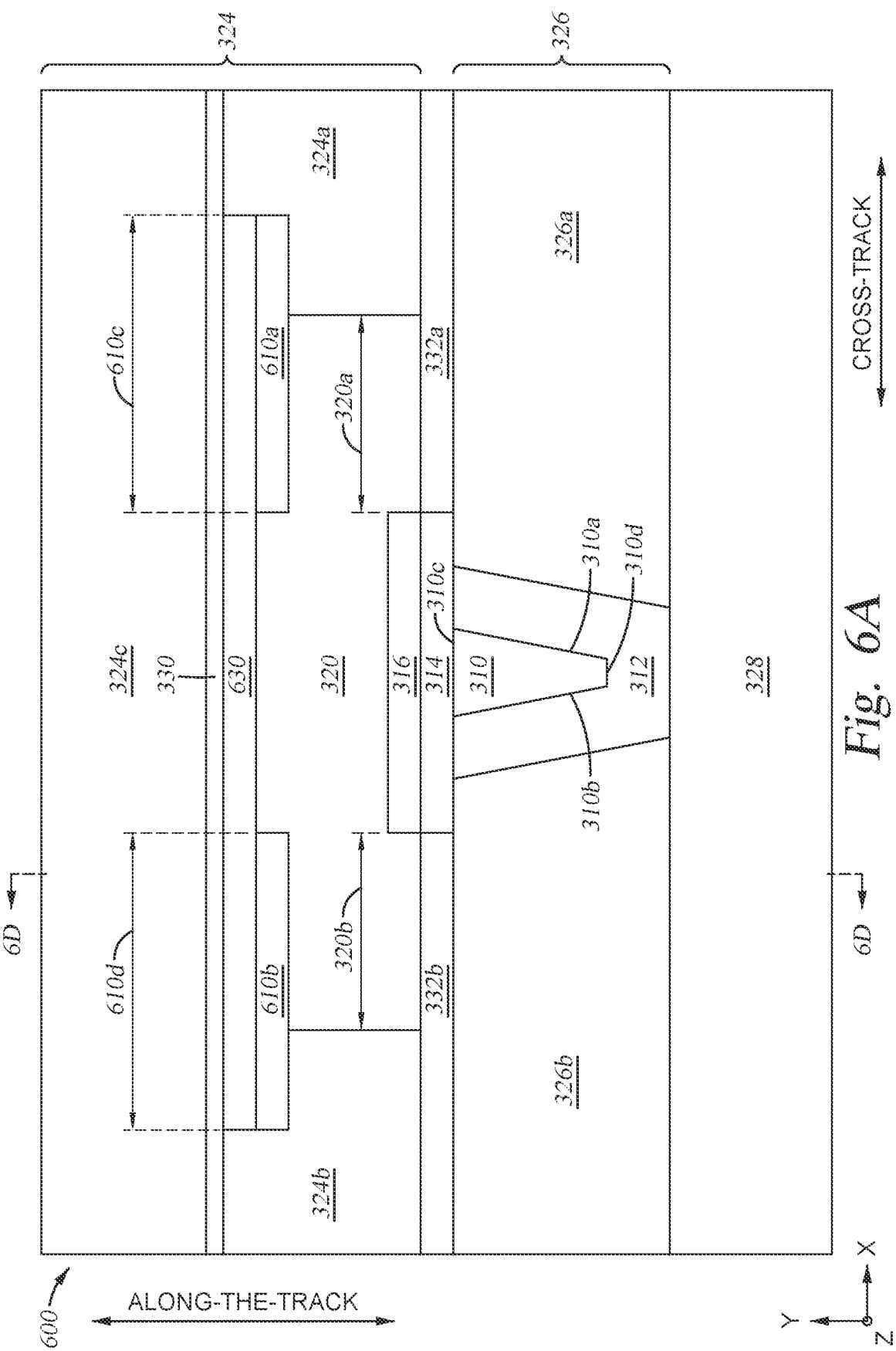

As shown in FIG. 6A, a MFS view of the magnetic recording head 600, the magnetic recording head 600 comprises a main pole 310 disposed between a first side shield 326a and a second side shield 326b in the x-direction and between a trailing shield 324 and leading shield 328 in the y-direction. The first side shield 326a and the second side shield 326b may be collectively referred to as the side shields 326. A side gap 312 is disposed adjacent to the first surface 310a of the main pole 310, the second surface 310b of the main pole 310, and the fourth surface 310d of the main pole 310. The side gap 312 surrounds the main pole 310, separating the main pole 310 from the side shields 326. A first insulation layer 330 is disposed within the trailing shield 324 such as the magnetic recording head 300 of FIGS. 3A and 3B or the magnetic recording head 301 of FIG. 3C. A second insulation layer 332 comprising a first portion 332a and a second portion 332b, is disposed between the side shields 326 and the trailing shield 324 in the y-direction, as similarly shown in FIGS. 3A-3C. The first portion 332a of the second insulation layer 332 is disposed above the first side shield 326a and the second portion 332b of the second insulation layer is disposed above the second side shield 326b. A third insulation layer 630 is further disposed between the leads 610a, 610b and the third portion 324c of the trailing shield 324.

The trailing shield 324 comprises a first portion 324a disposed above the first side shield 326a, a second portion 324b disposed above the second side shield 326b, a high moment seed layer 320 disposed between the first portion 324a and the second portion 324b in the x-direction, and a third portion 324c disposed above each of the first portion 324a, the high moment seed layer 320, and the second portion 324b. Similar to FIGS. 3A-3E and FIG. 4, the high moment seed layer 320 may comprises a bump layer 318 (not shown), disposed above a low resistance layer 316 (not shown). The high moment seed layer 320 and the low resistance layer 316 each comprises a first overhang portion 320a extending in the x-direction over the first side shield 326a from the main pole 310 has a width of about 100 nm to about 500 nm, and a second overhang portion 320b extending in the x-direction over the second side shield 326b from the main pole 310 has a width of about 100 nm to about 500 nm.

The magnetic recording head 600 further comprises a first lead 610a disposed between the high moment seed layer 320 and the first portion 324a of the trailing shield 324 in the x-direction and a second lead 610b disposed between the high moment seed layer 320 and the second portion 324b of the trailing shield 324 in the x-direction. The first lead 610a and the second lead 610b may collectively be referred to as the leads 610. The first lead 610a has a first contact area 610c extending across first overhang portion 320a in the x-direction and above to the first portion 324a of the trailing shield 324 in the y-direction at the MFS. The second lead 610b has a second contact area 610d extending across the second overhang portion 320b in the x-direction and above the second portion 324b of the trailing shield 324 in the y-direction at the MFS. The leads 610 comprise a non-magnetic low resistivity material such as copper.

Figure 6B:
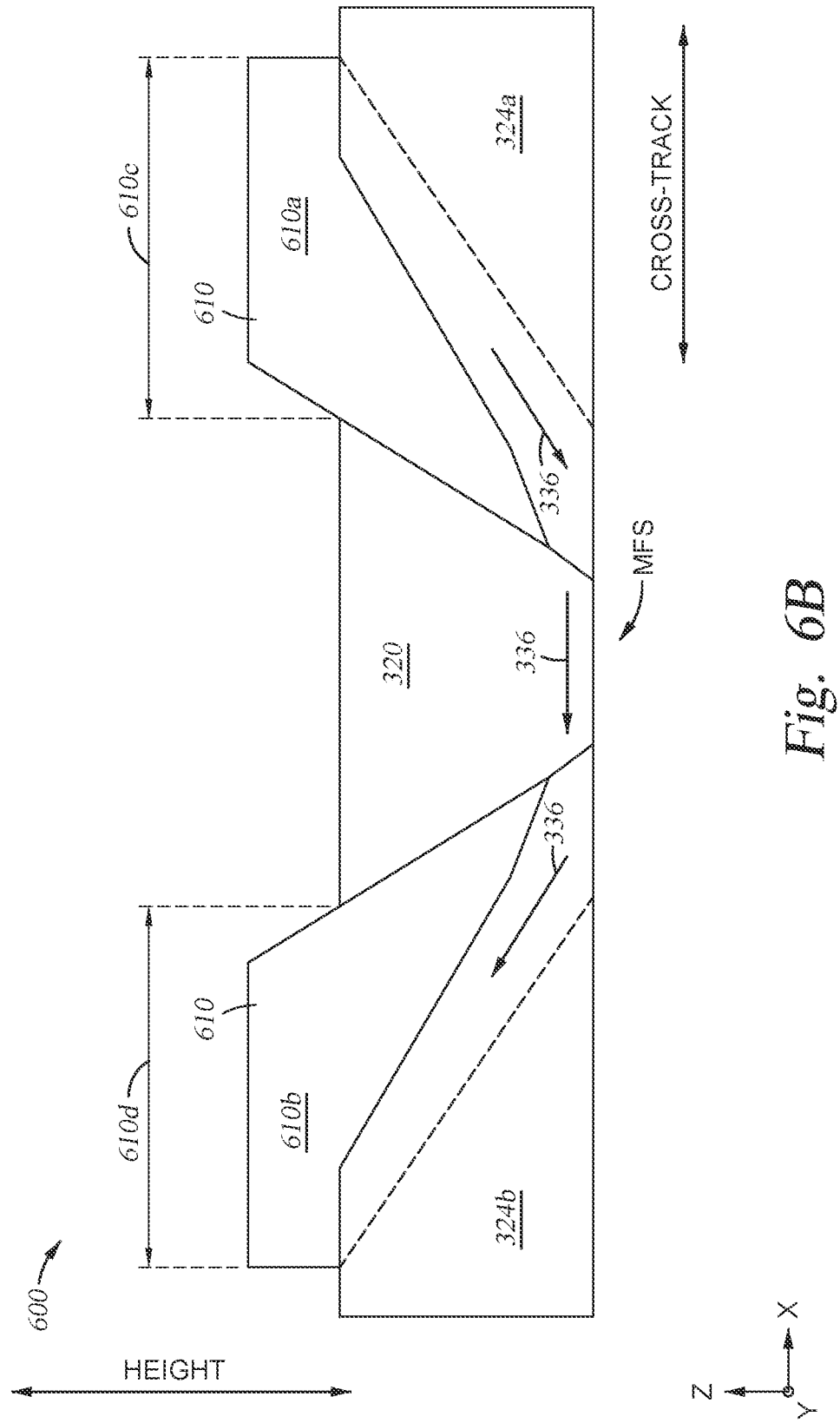

FIG. 6B illustrates a cross track cross sectional view of the magnetic recording head 600. The first contact area 610c and the second contact area 610d of the leads 610 that are disposed above the first overhang portion 320a (not shown) and the second overhang portion 320b (not shown) and extend beyond the trailing shield 324. The dotted lines indicate the portion of the first contact area 610c and the portion of the second contact area 610d of the leads 610 that are disposed behind the trailing shield 324 in the y-direction and are not visible in the cross-sectional view. During operation, the leads 610 are configured to flow a first current 336 from the first lead 610a through the trailing shield 324, the high moment seed layer 320, and across the third surface 310c of the main pole 310 to the second lead 610b, or from the second lead 610b through the trailing shield 324, the high moment seed layer 320, and across the third surface 310c of the main pole 310 to the first lead 610a. The first insulation layer 330 (as described in FIGS. 3A-3C, 3E, and 3F above but not shown here) helps direct the first current 336 through the first portion 324a and the second portion 324b of the trailing shield 324, into the high moment seed layer 320, and away from the third portion 324c of the trailing shield 324.

In one or more embodiments, the second insulation layer 332 (as described in FIGS. 3A-3C above but not shown here) helps direct the first current 336 through the trailing shield 324, into the high moment seed layer 320, and away from the side shields 326.

In one or more embodiments, the second insulation layer 332 (as described in FIG. 3E above but not shown here) helps direct the second current 338 through the trailing shield 324, the side shields 326, and the leading shield 328 (not shown) into the high moment seed layer 320.

Figure 6C:
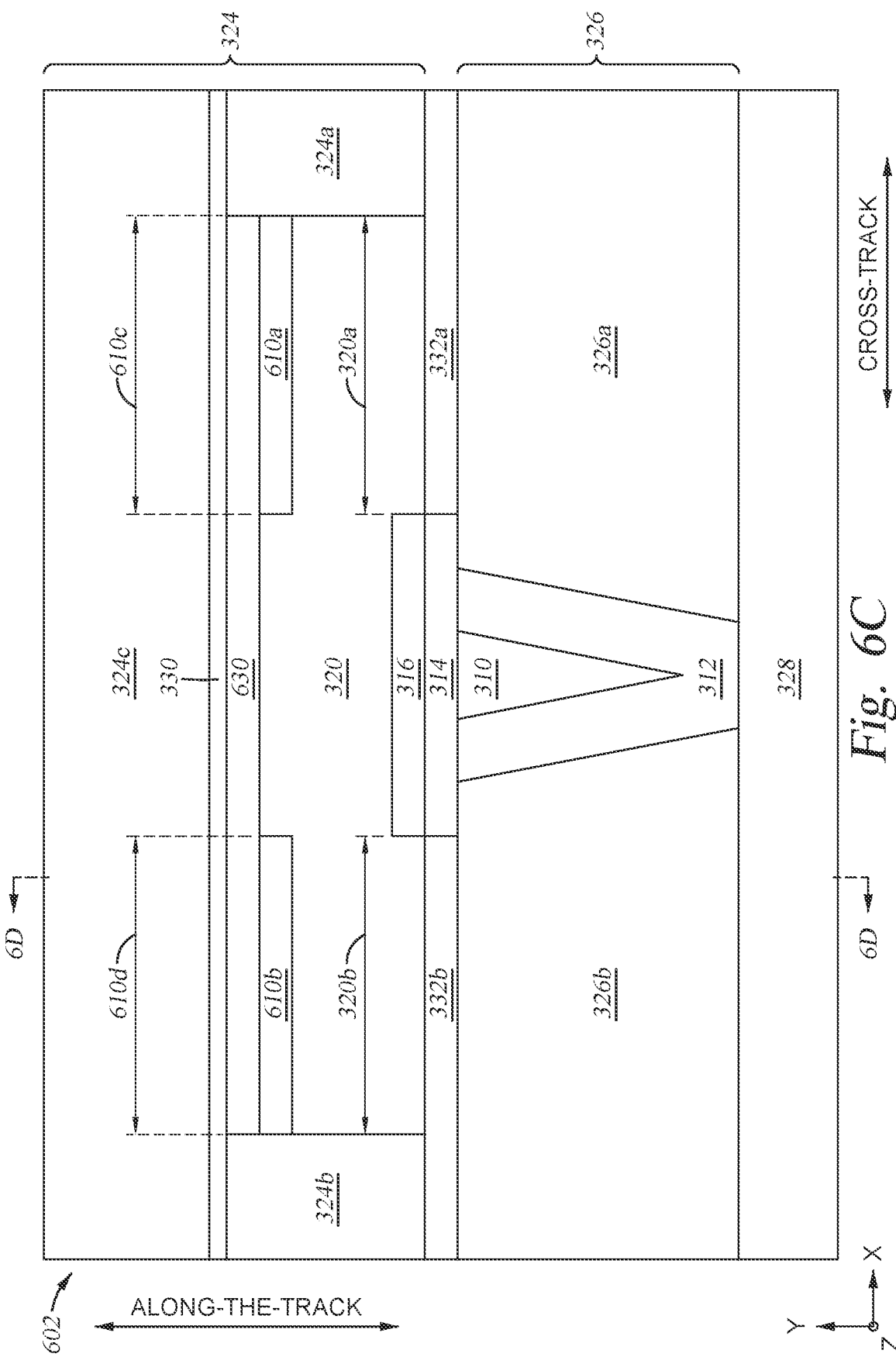

FIG. 6C illustrates a MFS view of a magnetic recording head 602, according to one embodiment. It is to be understood that the magnetic recording head 602 may comprise or be used in combination with any of the magnetic recording head 300 of FIGS. 3A and 3B, the magnetic recording head 301 of FIG. 3C, the magnetic recording head 304 of FIG. 3D, and/or the magnetic recording head 305 of FIG. 3E. The magnetic recording head 602 is the same as the magnetic recording head 600 of FIGS. 6A and 6B; however, the first contact area 610c and the second contact area 610d of the leads 610 differ. In the magnetic recording head 602, first contact area 610c of the first lead 610a and the second contact area 610d of the second lead 610b are disposed completely within the high moment seed layer 320. The first contact are 610c of the first lead 610a is disposed above the first overhang portion 320a at the MFS. The second contact area 610d of the second lead 610b is disposed above the second overhang portion 320b at the MFS.

Figure 6D:
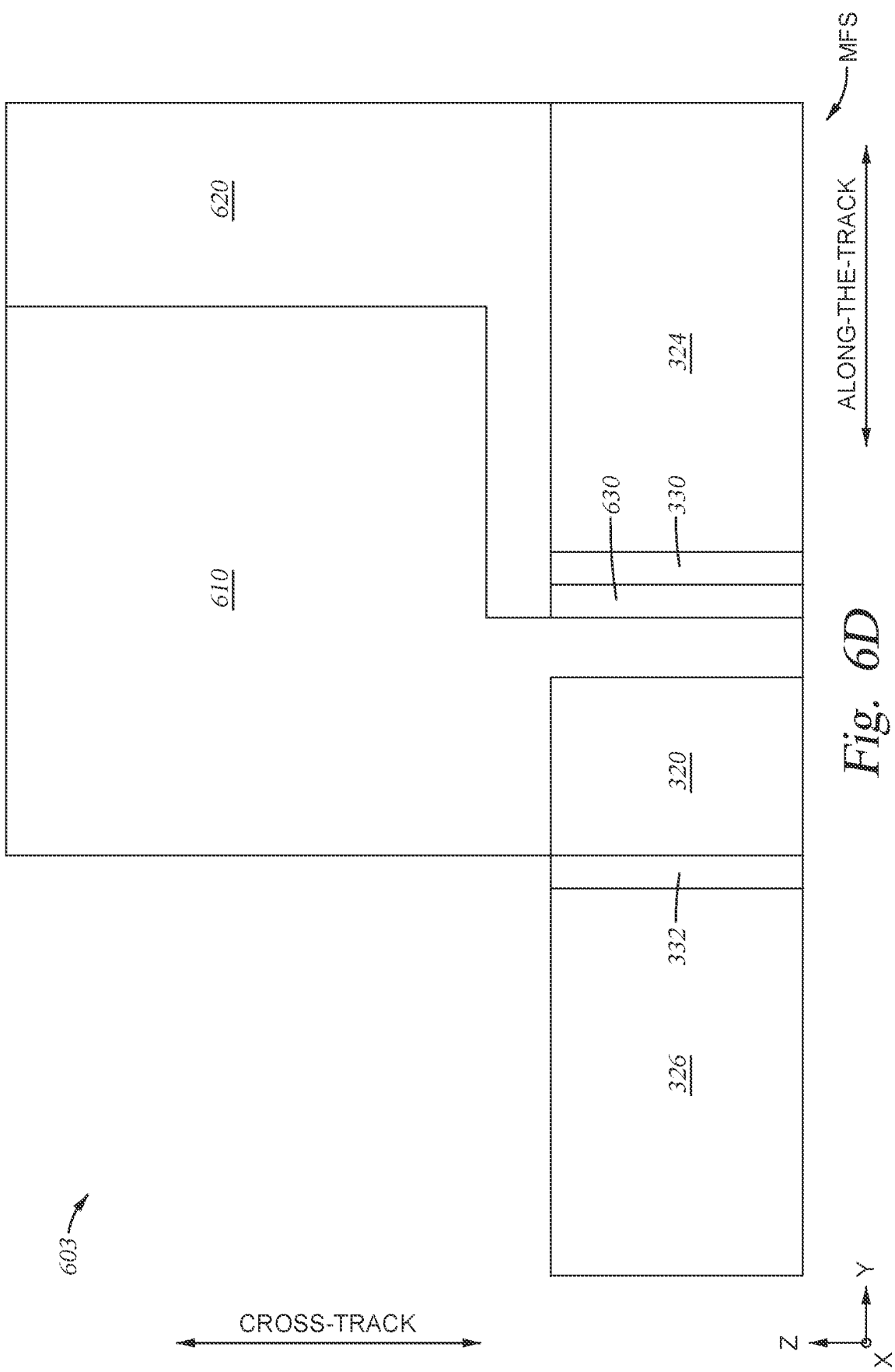

FIG. 6D illustrates a cross sectional view of the magnetic recording head 603 taken in the along the track direction in the location indicated in FIGS. 6A and 6C. The magnetic recording head 603 may be the magnetic recording head 600 of FIGS. 6A and 6B or the magnetic recording head 602 of FIG. 6C. The leads 610 are disposed in contact with the high moment seed layer 320 and a dielectric layer 620. The leads 610 are further disposed in contact with the MFS. In this cross-sectional view, the main pole 310 is obscured by the side shield 326.

Figure 6E:
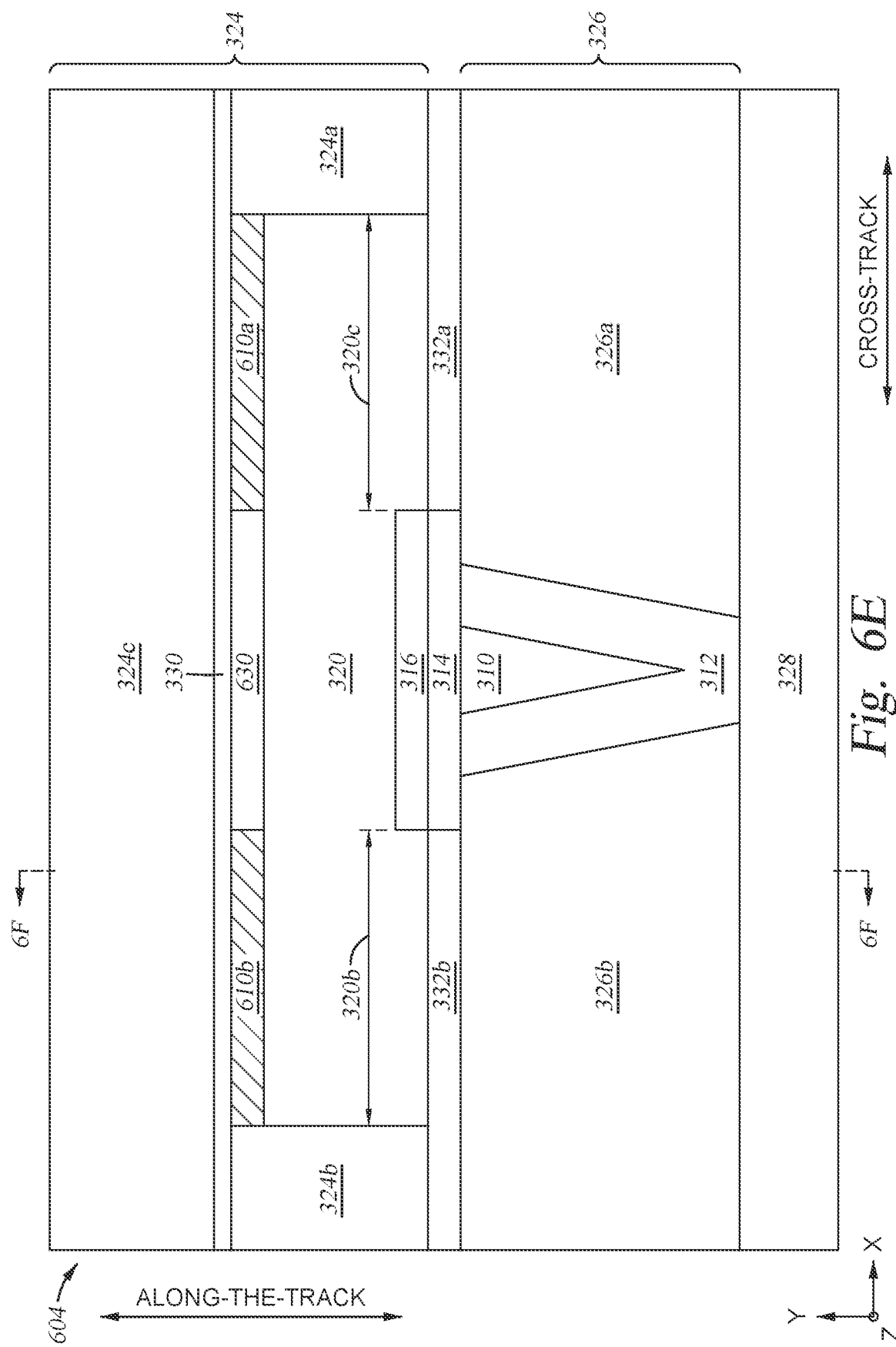

FIG. 6E illustrates a MFS view of a magnetic recording head 604, according to one embodiment. It is to be understood that the magnetic recording head 604 may comprise or be used in combination with any of the magnetic recording head 300 of FIGS. 3A and 3B, the magnetic recording head 301 of FIG. 3C, the magnetic recording head 304 of FIG. 3D, and/or the magnetic recording head 305 of FIG. 3E. The magnetic recording head 604 is the same as the magnetic recording head 600 of FIG. 6A or the magnetic recording head 602 of FIG. 6C; however, the first contact area 610c (not shown) and the second contact area 610d (not shown) of the leads 610 differ. The first contact area 610c and the second contact area 610d of the leads 610 are recessed from the MFS so that they are not visible in a MFS view.

FIG. 6F illustrates a cross sectional view of the magnetic recording head 604 of FIG. 6E taken in the along the track direction in the location indicated in FIG. 6E. The leads 610 are disposed in contact with the high moment seed layer 320 and a dielectric layer 620. The leads 610 are recessed a distance of about 2 nm to about 20 nm from the MFS. In this cross-sectional view, the main pole 310 is obscured by the side shield 326.

By implementing a first cross-track current flow in the trailing shield across the third surface of the main pole and a second cross-track current flow in the side shields around the main pole, the auxiliary magnetic field is produced by the current sources resulting in a higher total magnetic field acting on the media without the need to increase the size of the magnetic recording pole.

In one embodiment, a magnetic recording head comprising: a main pole; a first side shield disposed adjacent to a first surface of the main pole; a second side shield disposed adjacent to a second surface of the main pole opposite the first surface; a high moment seed layer disposed adjacent to a third surface of the main pole; a trailing shield disposed over the third surface of the main pole, wherein: a first portion of the trailing shield is disposed adjacent to the first side shield; a second portion of the trailing shield is disposed adjacent to the second side shield; and a third portion of the trailing shield is disposed adjacent to the first portion, the second portion, and the high moment seed layer; a first lead disposed between the first portion of the trailing shield and the high moment seed layer; and a second lead disposed between the second portion of the trailing shield and the high moment seed layer.

The magnetic recording head, wherein the first lead and the second lead each comprises a non-magnetic material. The magnetic recording head, wherein a first insulation layer is disposed between the first lead and the trailing shield at a media facing surface, and further disposed between the second lead and the trailing shield at the media facing surface. The magnetic recording head, wherein the first lead and the second lead extend to a media facing surface. The magnetic recording head, wherein the first lead and the second lead are recessed a distance of about 5 nm to about 20 nm from a media facing surface. The magnetic recording head, wherein the high moment seed layer comprises: a first overhang portion extending along a cross-track direction at a media facing surface from a first edge of the third surface of the main pole, wherein the first overhang portion has a first width of about 100 nm to about 500 nm; and a second overhang portion extending along the cross-track direction at the media facing surface from a second edge of the third surface of the main pole, wherein the second overhang portion has a second width of about 100 nm to about 500 nm. The magnetic recording head, wherein the first lead has a contact area at the media facing surface equal to the first width of the first overhang portion, and wherein the second lead has a contact area at the media facing surface equal to the second width of the second overhang portion. The magnetic recording head, wherein the first lead has a first contact area at the media facing surface comprising the first overhang portion and the first portion of the trailing shield, and wherein the second lead has a second contact area at the media facing surface comprising the second overhang portion and the second portion of the trailing shield. The magnetic recording head, further comprising: a blocker layer disposed between the main pole and the high moment seed layer; and a low resistance layer disposed between the blocker layer and the high moment seed layer. A magnetic recording device comprising the magnetic recording head.

In another embodiment, a magnetic recording drive comprising: a magnetic recording head, comprising: a main pole; a first side shield disposed adjacent to a first surface of the main pole; a second side shield disposed adjacent to a second surface of the main pole, the second surface being disposed opposite the first surface; a high moment seed layer disposed adjacent to a third surface of the main pole; a trailing shield disposed over the third surface of the main pole, wherein: a first portion of the trailing shield is disposed over the first side shield; a second portion of the trailing shield is disposed over the second side shield; and a third portion of the trailing shield is disposed over the first portion, the second portion, and the high moment seed layer; a first insulation layer disposed within the trailing shield; a leading shield disposed adjacent to a fourth surface of the main pole opposite the third surface of the main pole; and a second insulation layer disposed within the first side shield, the leading shield, and the second side shield; and means for flowing a current through the magnetic recording head.

The magnetic recording head, wherein the first insulation layer is disposed between the third portion of the trailing shield and the high moment seed layer. The magnetic recording head, wherein the means for flowing a current is configured to flow a current from the first portion of the trailing shield, through the high moment seed layer, to the second portion of the trailing shield, or from the second portion of the trailing shield, through the high moment seed layer, to the first portion of the trailing shield. The magnetic recording head, wherein the first insulation layer is disposed within the third portion of the trailing shield. The magnetic recording head, wherein the means for flowing a current is configured to flow a current from the first portion and third portion of the trailing shield, through the high moment seed layer, to the second portion and the third portion of the trailing shield, or from the second portion and the third portion of the trailing shield, through the high moment seed layer, to the first portion and the third portion of the trailing shield. The magnetic recording head, wherein the means for flowing a current is configured to flow a current from the first side shield, through the leading shield, to the second side shield, or from the second side shield, through the leading shield, to the first side shield. The magnetic recording drive, wherein the magnetic recording head further comprises a third insulation layer disposed between the high moment seed layer and the first insulation layer. The magnetic recording drive, wherein the magnetic recording head further comprises: a blocker layer disposed between the main pole and the high moment seed layer; and a low resistance layer disposed between the blocker layer and the high moment seed layer.

In yet another embodiment, a magnetic recording head comprising: a main pole; a first side shield disposed adjacent to a first surface of the main pole; a second side shield disposed adjacent to a second surface of the main pole opposite the first surface of the main pole; a trailing shield disposed over a third surface of the main pole, wherein: a first portion of the trailing shield is disposed over the first side shield; a second portion of the trailing shield is disposed over the second side shield; and a third portion of the trailing shield is disposed over the first portion, the second portion, and a third surface of the main pole; an insulation layer disposed adjacent to the trailing shield; a first lead disposed over the first portion of the trailing shield; and a second lead disposed over the second portion of the trailing shield.

The magnetic recording head, wherein the first lead and the second lead are each comprises copper. The magnetic recording head, wherein: a first portion of the insulation layer is disposed adjacent to a first outer edge of the first portion of the trailing shield; a second portion of the insulation layer is disposed adjacent to a first inner edge of the first portion of the trailing shield; the first inner edge is disposed opposite to the first outer edge; a third portion of the insulation layer is disposed adjacent to a second outer edge of the second portion of the trailing shield; a fourth portion of the insulation layer is disposed adjacent to a second inner edge of the second portion of the trailing shield; and the second inner edge is disposed opposite to the second outer edge. The magnetic recording head, further comprising: a blocker layer disposed between the third surface of the main pole and the trailing shield; and a low resistance layer disposed between the blocker layer and the trailing shield. A magnetic recording device comprising the magnetic recording head.

While the foregoing is directed to embodiments of the present disclosure, other and further embodiments of the disclosure may be devised without departing from the basic scope thereof, and the scope thereof is determined by the claims that follow.

What is claimed is:
1. A magnetic recording head comprising:
   a main pole;
   a first side shield disposed adjacent to a first surface of the main pole;
   a second side shield disposed adjacent to a second surface of the main pole opposite the first surface;
   a high moment seed layer disposed adjacent to a third surface of the main pole;
   a trailing shield disposed over the third surface of the main pole, wherein:
      a first portion of the trailing shield is disposed adjacent to the first side shield;

a second portion of the trailing shield is disposed adjacent to the second side shield; and
a third portion of the trailing shield is disposed adjacent to the first portion, the second portion, and the high moment seed layer;
a first lead disposed between the first portion of the trailing shield and the high moment seed layer; and
a second lead disposed between the second portion of the trailing shield and the high moment seed layer.

2. The magnetic recording head of claim 1, wherein the first lead and the second lead each comprises a non-magnetic material.

3. The magnetic recording head of claim 1, wherein a first insulation layer is disposed between the first lead and the trailing shield at a media facing surface, and further disposed between the second lead and the trailing shield at the media facing surface.

4. The magnetic recording head of claim 1, wherein the first lead and the second lead extend to a media facing surface.

5. The magnetic recording head of claim 1, wherein the first lead and the second lead are recessed a distance of about 5 nm to about 20 nm from a media facing surface.

6. The magnetic recording head of claim 1, wherein the high moment seed layer comprises:
a first overhang portion extending along a cross-track direction at a media facing surface from a first edge of the third surface of the main pole, wherein the first overhang portion has a first width of about 100 nm to about 500 nm; and
a second overhang portion extending along the cross-track direction at the media facing surface from a second edge of the third surface of the main pole, wherein the second overhang portion has a second width of about 100 nm to about 500 nm.

7. The magnetic recording head of claim 6, wherein the first lead has a contact area at the media facing surface equal to the first width of the first overhang portion, and wherein the second lead has a contact area at the media facing surface equal to the second width of the second overhang portion.

8. The magnetic recording head of claim 6, wherein the first lead has a first contact area at the media facing surface comprising the first overhang portion and the first portion of the trailing shield, and wherein the second lead has a second contact area at the media facing surface comprising the second overhang portion and the second portion of the trailing shield.

9. The magnetic recording head of claim 1, further comprising:
a blocker layer disposed between the main pole and the high moment seed layer; and
a low resistance layer disposed between the blocker layer and the high moment seed layer.

10. A magnetic recording device comprising the magnetic recording head of claim 1.

11. A magnetic recording drive comprising:
a magnetic recording head comprising:
a main pole;
a first side shield disposed adjacent to a first surface of the main pole;
a second side shield disposed adjacent to a second surface of the main pole, the second surface being disposed opposite the first surface;
a high moment seed layer disposed adjacent to a third surface of the main pole;
a trailing shield disposed over the third surface of the main pole, wherein:
a first portion of the trailing shield is disposed over the first side shield;
a second portion of the trailing shield is disposed over the second side shield; and
a third portion of the trailing shield is disposed over the first portion, the second portion, and the high moment seed layer;
a first insulation layer disposed within the trailing shield;
a leading shield disposed adjacent to a fourth surface of the main pole opposite the third surface of the main pole; and
a second insulation layer disposed within the first side shield, the leading shield, and the second side shield; and
means for flowing a current through the magnetic recording head.

12. The magnetic recording drive of claim 11, wherein the first insulation layer is disposed between the third portion of the trailing shield and the high moment seed layer.

13. The magnetic recording drive of claim 12, wherein the means for flowing a current is configured to flow a current from the first portion of the trailing shield, through the high moment seed layer, to the second portion of the trailing shield, or from the second portion of the trailing shield, through the high moment seed layer, to the first portion of the trailing shield.

14. The magnetic recording drive of claim 11, wherein the first insulation layer is disposed within the third portion of the trailing shield.

15. The magnetic recording drive of claim 14, wherein the means for flowing a current is configured to flow a current from the first portion and third portion of the trailing shield, through the high moment seed layer, to the second portion and the third portion of the trailing shield, or from the second portion and the third portion of the trailing shield, through the high moment seed layer, to the first portion and the third portion of the trailing shield.

16. The magnetic recording drive of claim 11, wherein the means for flowing a current is configured to flow a current from the first side shield, through the leading shield, to the second side shield, or from the second side shield, through the leading shield, to the first side shield.

17. The magnetic recording drive of claim 11, wherein the magnetic recording head further comprises a third insulation layer disposed between the high moment seed layer and the first insulation layer.

18. The magnetic recording drive of claim 11, wherein the magnetic recording head further comprises:
a blocker layer disposed between the main pole and the high moment seed layer; and
a low resistance layer disposed between the blocker layer and the high moment seed layer.

19. A magnetic recording head comprising:
a main pole;
a first side shield disposed adjacent to a first surface of the main pole;
a second side shield disposed adjacent to a second surface of the main pole opposite the first surface of the main pole;
a trailing shield disposed over a third surface of the main pole, wherein:
a first portion of the trailing shield is disposed over the first side shield;
a second portion of the trailing shield is disposed over the second side shield; and a third portion of the trailing shield is disposed over the first portion, the second portion, and the third surface of the main pole;
an insulation layer disposed adjacent to the trailing shield;
a first lead disposed over the first portion of the trailing shield; and
a second lead disposed over the second portion of the trailing shield.

20. The magnetic recording head of claim 19, wherein the first lead and the second lead each individually comprises copper.

21. The magnetic recording head of claim 19, wherein:
a first portion of the insulation layer is disposed adjacent to a first outer edge of the first portion of the trailing shield;
a second portion of the insulation layer is disposed adjacent to a first inner edge of the first portion of the trailing shield;
the first inner edge is disposed opposite to the first outer edge;
a third portion of the insulation layer is disposed adjacent to a second outer edge of the second portion of the trailing shield;
a fourth portion of the insulation layer is disposed adjacent to a second inner edge of the second portion of the trailing shield; and
the second inner edge is disposed opposite to the second outer edge.

22. The magnetic recording head of claim 19, further comprising:
a blocker layer disposed between the third surface of the main pole and the trailing shield; and
a low resistance layer disposed between the blocker layer and the trailing shield.

23. A magnetic recording device comprising the magnetic recording head of claim 19.

* * * * *